(12) United States Patent
Smith, Jr. et al.

(10) Patent No.: US 10,787,200 B1
(45) Date of Patent: Sep. 29, 2020

(54) SUSPENSION SUPPORT FOR CARGO CARRYING VEHICLE

(71) Applicant: Extreme Trailers LLC, Dover, OH (US)

(72) Inventors: Leslie A. Smith, Jr., Alliance, OH (US); Ryan L. Rummell, Bowerston, OH (US)

(73) Assignee: EXTREME TRAILERS LLC, Dover, OH (US)

( * ) Notice: Subject to any disclaimer, the term of this patent is extended or adjusted under 35 U.S.C. 154(b) by 107 days.

(21) Appl. No.: 16/161,201

(22) Filed: Oct. 16, 2018

Related U.S. Application Data

(60) Provisional application No. 62/574,944, filed on Oct. 20, 2017.

(51) Int. Cl.

| | | |
|---|---|---|
| *B62D 21/11* | (2006.01) | |
| *B62D 53/06* | (2006.01) | |
| *B62D 21/03* | (2006.01) | |
| *B62D 63/08* | (2006.01) | |
| *B60G 7/00* | (2006.01) | |
| *B60G 11/27* | (2006.01) | |
| *B60G 5/04* | (2006.01) | |

(52) U.S. Cl.
CPC ............... *B62D 21/11* (2013.01); *B60G 5/04* (2013.01); *B60G 7/001* (2013.01); *B60G 11/27* (2013.01); *B62D 21/03* (2013.01); *B62D 53/061* (2013.01); *B62D 63/08* (2013.01); *B60G 2200/326* (2013.01); *B60G 2202/152* (2013.01); *B60G 2204/143* (2013.01); *B60G 2300/042* (2013.01)

(58) Field of Classification Search
CPC ...... B62D 21/11; B62D 53/061; B62D 21/03; B62D 63/08; B60G 7/001; B60G 11/27; B60G 5/04; B60G 2202/152; B60G 2200/326; B60G 2300/042; B60G 2204/143

See application file for complete search history.

(56) References Cited

U.S. PATENT DOCUMENTS

| 3,062,338 | A | * | 11/1962 | De Ridder | ................ | E04C 2/08 |
| --- | --- | --- | --- | --- | --- | --- |
| | | | | | | 52/579 |
| 3,380,216 | A | * | 4/1968 | Spence | ................ | B62D 33/046 |
| | | | | | | 52/592.4 |
| 3,460,299 | A | * | 8/1969 | Wilson | .................... | E04B 9/303 |
| | | | | | | 52/144 |
| 3,909,059 | A | * | 9/1975 | Benninger | ......... | B62D 25/2054 |
| | | | | | | 296/184.1 |
| 4,060,145 | A | * | 11/1977 | Kingman | ................ | B60G 5/04 |
| | | | | | | 280/789 |

(Continued)

*Primary Examiner* — Darlene P Condra
(74) *Attorney, Agent, or Firm* — Ralph E. Jocke; Walker & Jocke

(57) ABSTRACT

A cargo carrying vehicle (10) includes a load support deck (44) comprised of a plurality of laterally adjacent deck pieces (46). Each deck piece includes in transverse cross section a plurality of elongated cavities (56) in which respective support members (100) may be selectively longitudinally positioned. A frame (128) includes a support and mounting arrangement for one or more suspension subframes (142) that each include a wheel supporting axle (144). Brace plates (168, 170, 172) operatively connect with frame rails (130, 132) and lateral support ribs (140) to reinforce the frame structure and attach the suspension subframe.

20 Claims, 23 Drawing Sheets

(56) References Cited

U.S. PATENT DOCUMENTS

| | | | | | |
|---|---|---|---|---|---|
| 4,612,744 | A | * | 9/1986 | Shamash | E04C 3/36 |
| | | | | | 52/220.1 |
| 4,787,670 | A | * | 11/1988 | Bentz | B62D 33/06 |
| | | | | | 296/182.1 |
| 4,863,189 | A | * | 9/1989 | Lindsay | B60P 3/32 |
| | | | | | 280/789 |
| 5,026,112 | A | * | 6/1991 | Rice | B60J 5/062 |
| | | | | | 296/155 |
| 5,028,072 | A | * | 7/1991 | Lindsay | B60P 3/32 |
| | | | | | 280/789 |
| 5,794,397 | A | * | 8/1998 | Ludwig | E04B 9/006 |
| | | | | | 52/28 |
| 6,256,953 | B1 | * | 7/2001 | Vulin | E04F 19/064 |
| | | | | | 52/281 |
| 6,807,735 | B2 | * | 10/2004 | Crean | B62D 21/02 |
| | | | | | 29/897.2 |
| 2007/0145702 | A1 | * | 6/2007 | Booher | B60G 7/02 |
| | | | | | 280/124.116 |
| 2012/0104796 | A1 | * | 5/2012 | Balaz | B62D 29/008 |
| | | | | | 296/184.1 |
| 2017/0240217 | A1 | * | 8/2017 | Storz | B62D 33/048 |

\* cited by examiner

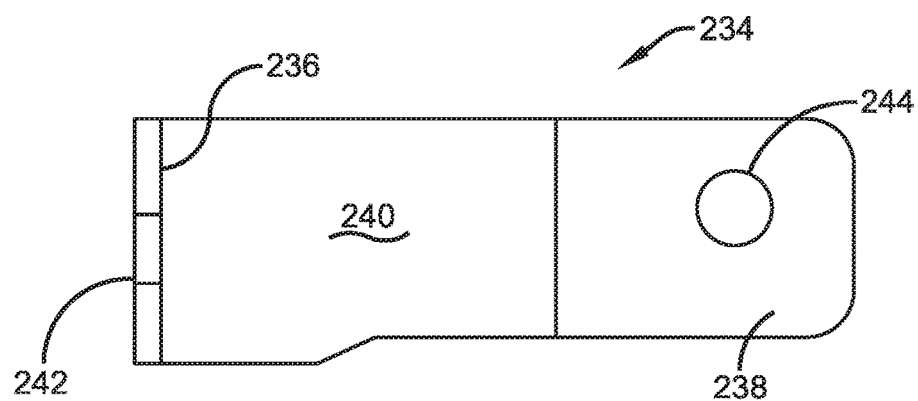
FIG. 26
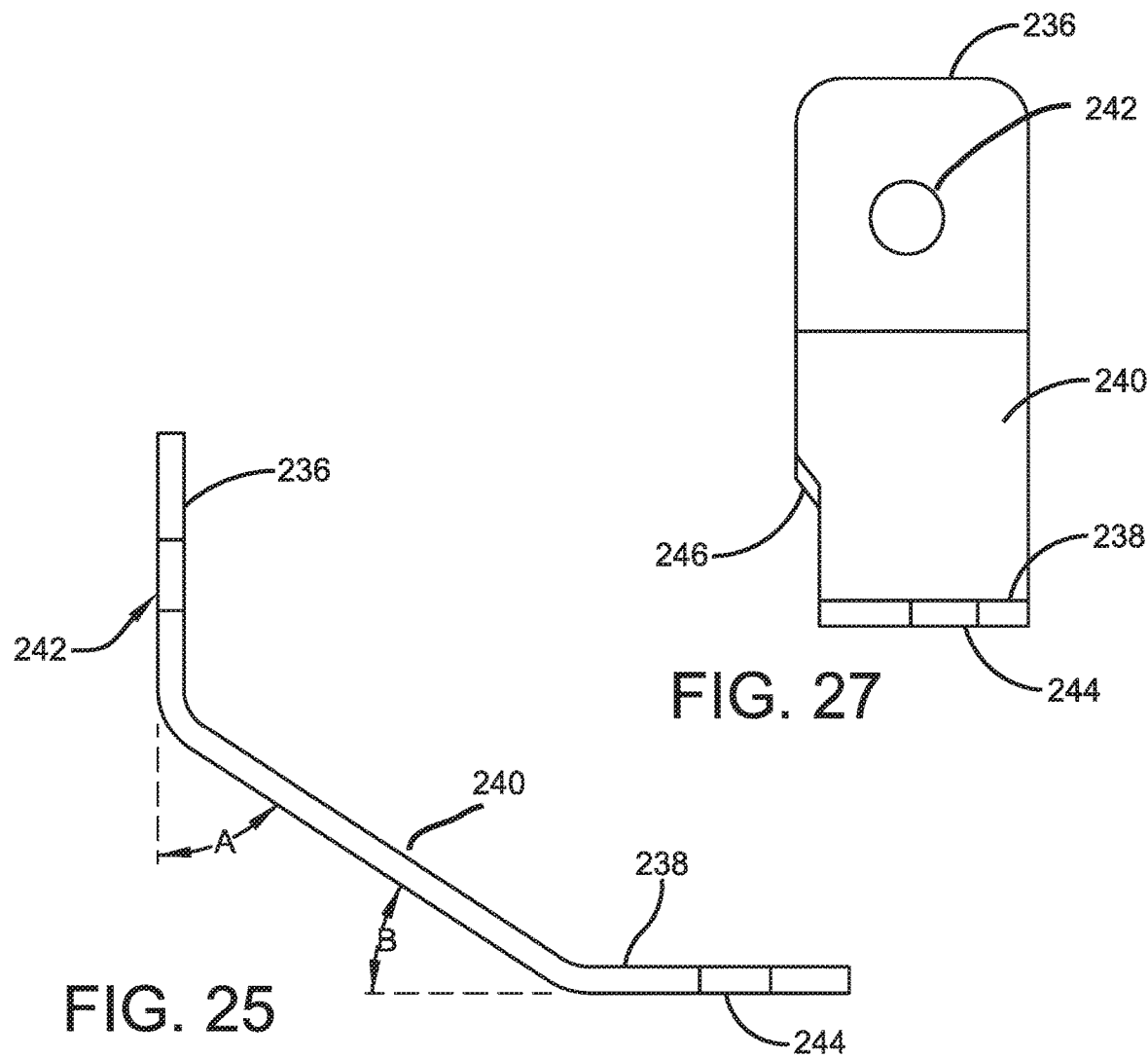
FIG. 27
FIG. 25

US 10,787,200 B1

SUSPENSION SUPPORT FOR CARGO CARRYING VEHICLE

TECHNICAL FIELD

Exemplary embodiments described herein relate to cargo carrying vehicles. Exemplary embodiments further relate to a suspension support and mounting arrangement for a cargo carrying vehicle that has improved strength, ease of use, less wind resistance and lighter weight.

BACKGROUND

Cargo carrying vehicles such as semi-trailers must have sufficient strength to support the loads that result from the cargo being carried thereon and to withstand dynamic forces that arise during movement without sustaining permanent deformation or damage. Such vehicles include a suspension system that normally connects the axles and wheels to the frame structure of the vehicle. Such structures can be complex, heavy and increase wind resistance to movement of the cargo carrying vehicle at highway speeds.

Cargo carrying vehicles and the load supporting decks and suspension supporting structures thereof may benefit from improvements.

BRIEF DESCRIPTION OF DRAWINGS

FIG. 25 is a front view of an exemplary brace leg.

FIG. 26 is a top view of the exemplary brace leg.

FIG. 27 is a right side view of the brace leg.

DETAILED DESCRIPTION

Figure 1:
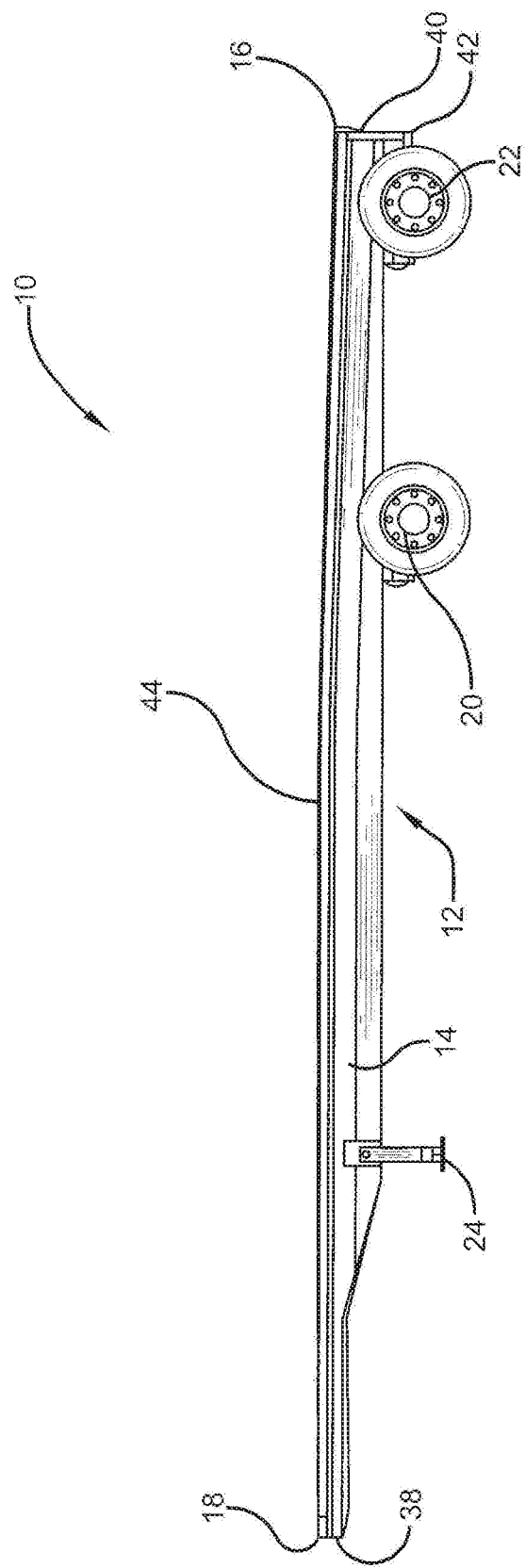
FIG. 1 is a side view of an exemplary cargo carrying vehicle in the form of a trailer.

Referring now to the drawings and particularly to FIG. 1, there is shown therein a cargo carrying vehicle 10. The exemplary cargo carrying vehicle comprises a trailer such as a road going trailer that is configured to be towed behind another vehicle such as a semi-tractor. However, it should be understood that this cargo carrying vehicle is exemplary and in other embodiments other types of cargo carrying vehicles may employ the principles and features discussed herein. Such vehicles may include, for example, truck beds, shipping containers, ships or other types of cargo carrying vehicles and structures that must support significant loads associated with cargo that is supported and/or transported.

Figure 2:
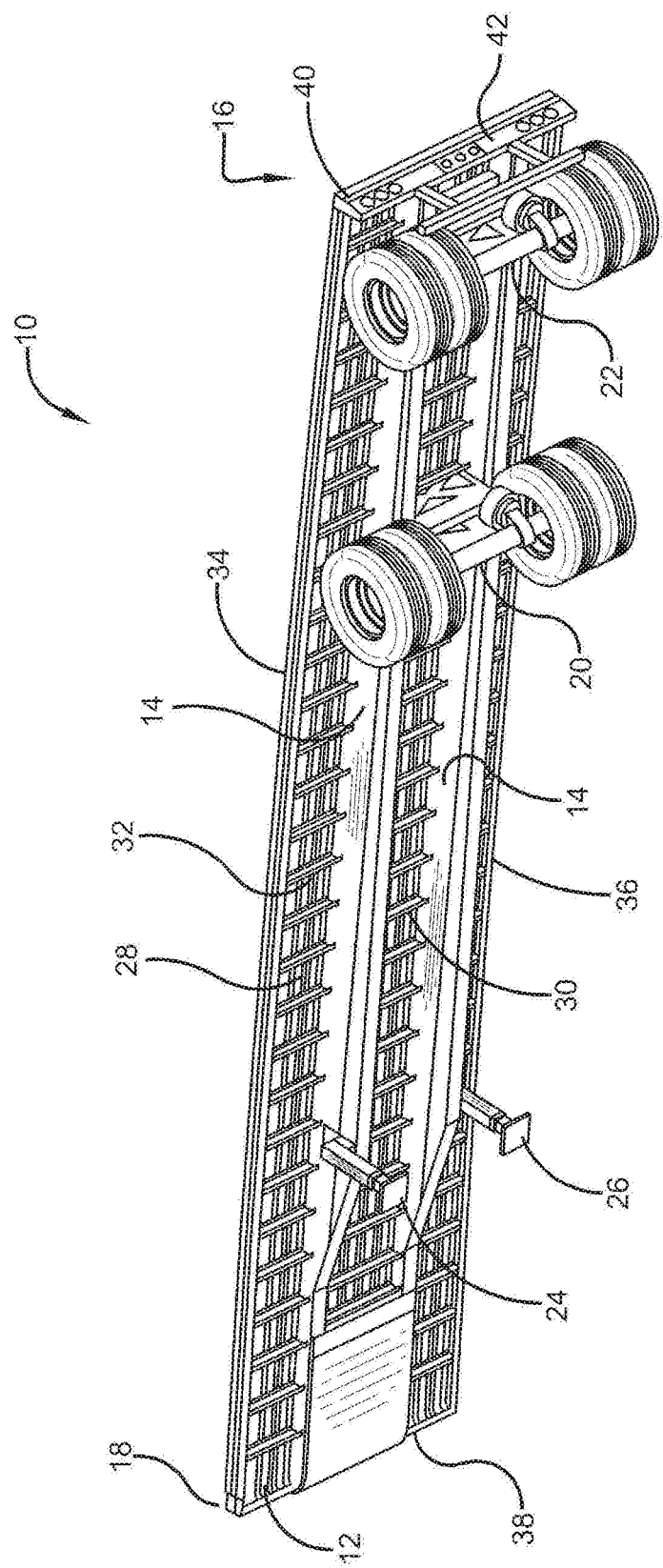
FIG. 2 is a bottom rear perspective view of the trailer shown in FIG. 1.
Figure 3:
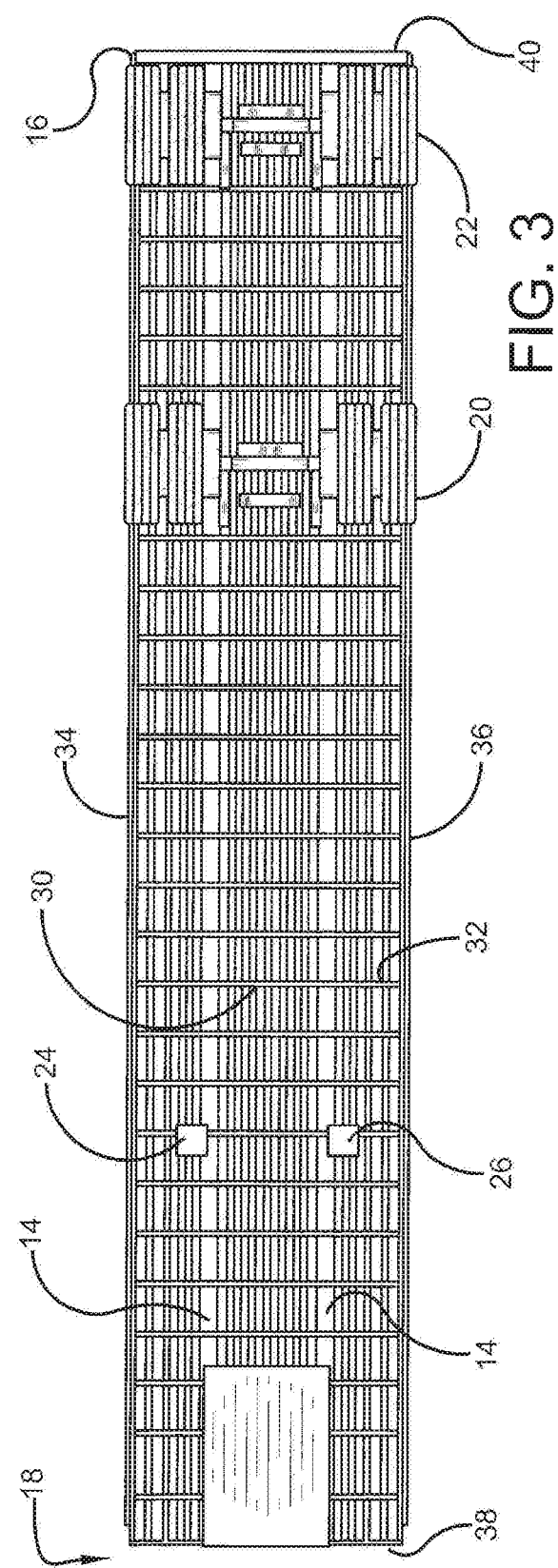
FIG. 3 is a bottom view of the trailer shown in FIG. 1.
Figure 4:
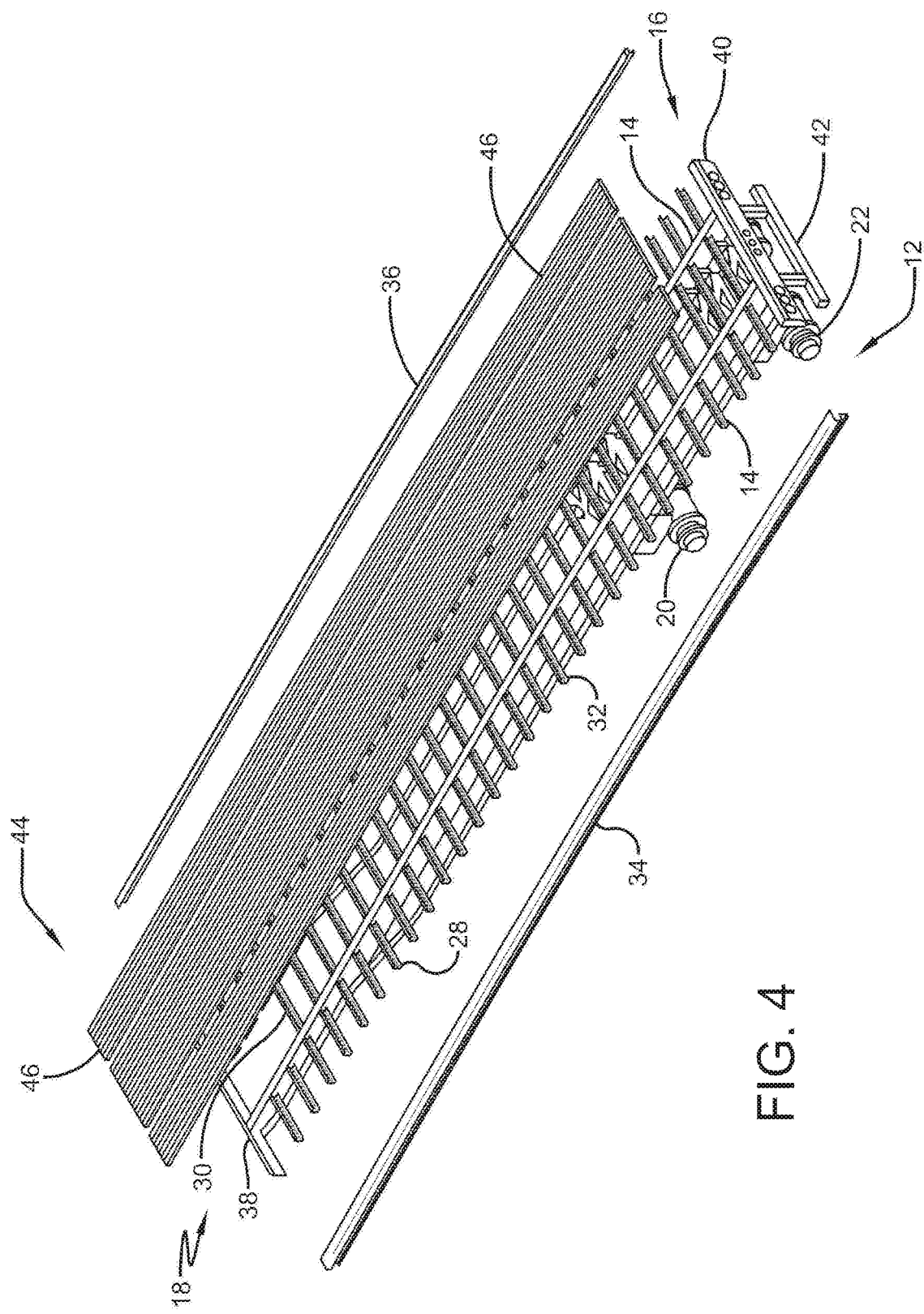
FIG. 4 is an exploded perspective view of the trailer.

The exemplary trailer 10 includes a frame 12. The exemplary frame 12 includes a pair of longitudinally elongated frame rails 14. As shown in FIGS. 2-4, the frame rails 14 extend substantially the entire length of the exemplary trailer. In the exemplary arrangement the frame rails 14 are substantially vertically thicker near the rear 16 of the trailer relative to the vertical thickness of the frame rails near the front 18 of the trailer.

The exemplary trailer includes a pair of axles 20 and 22. The axles are in operative connection with the frame rails 14 through respective subframe components. The exemplary embodiments of the subframe components include movable supports, air springs, shock absorbers and other suitable axle supporting components. Further, in exemplary embodiments the axles include tandem wheels and suitable braking components to enable over the road travel of the trailer.

The exemplary trailer further includes a pair of front supports 24, 26. The supports are selectively extendable to engage the pavement or other supporting surface on which the trailer is supported when the trailer is not being towed by a vehicle. The supports are selectively retractable so that they can be upwardly disposed from the pavement when the trailer is in connection with the tow vehicle.

The frame 12 of the exemplary trailer includes a plurality of cross members that are alternatively referred to herein as ribs 28. The ribs extend generally perpendicular to the frame rails. In the exemplary arrangement, central rib portions 30 span the area between the frame rails 14. Outboard rib portions 32 extend outside the frame rails. The outboard rib portions are engaged with frame side rails 34 and 36. The central and outboard rib portions, frame rails and side rails are joined together in fixed relation by welding or other fastening methods.

The exemplary frame further includes a front cross member 38 and a rear cross member 40. The front cross member 38 and the rear cross member 40 each extend perpendicularly relative to the frame rails 14 and between the end side rails 34, 36. The exemplary rear cross member has attached thereto, a guard 42 that is configured to block items from passing under the trailer. Further, the exemplary rear cross member includes vehicle taillights or other suitable features needed at the rear of the trailer. Of course it should be understood that these structures are exemplary. Further, exemplary trailers will also include a structure for releasable attachment of the trailer to a tow vehicle. This may include a trailer hitch, fifth wheel or other suitable engaging structure that enables the releasable engagement of the trailer and the vehicle which will provide the towing force to move the trailer. Of course it should be understood that these structures are exemplary and in other embodiments, different or additional structures may be utilized.

Figure 5:
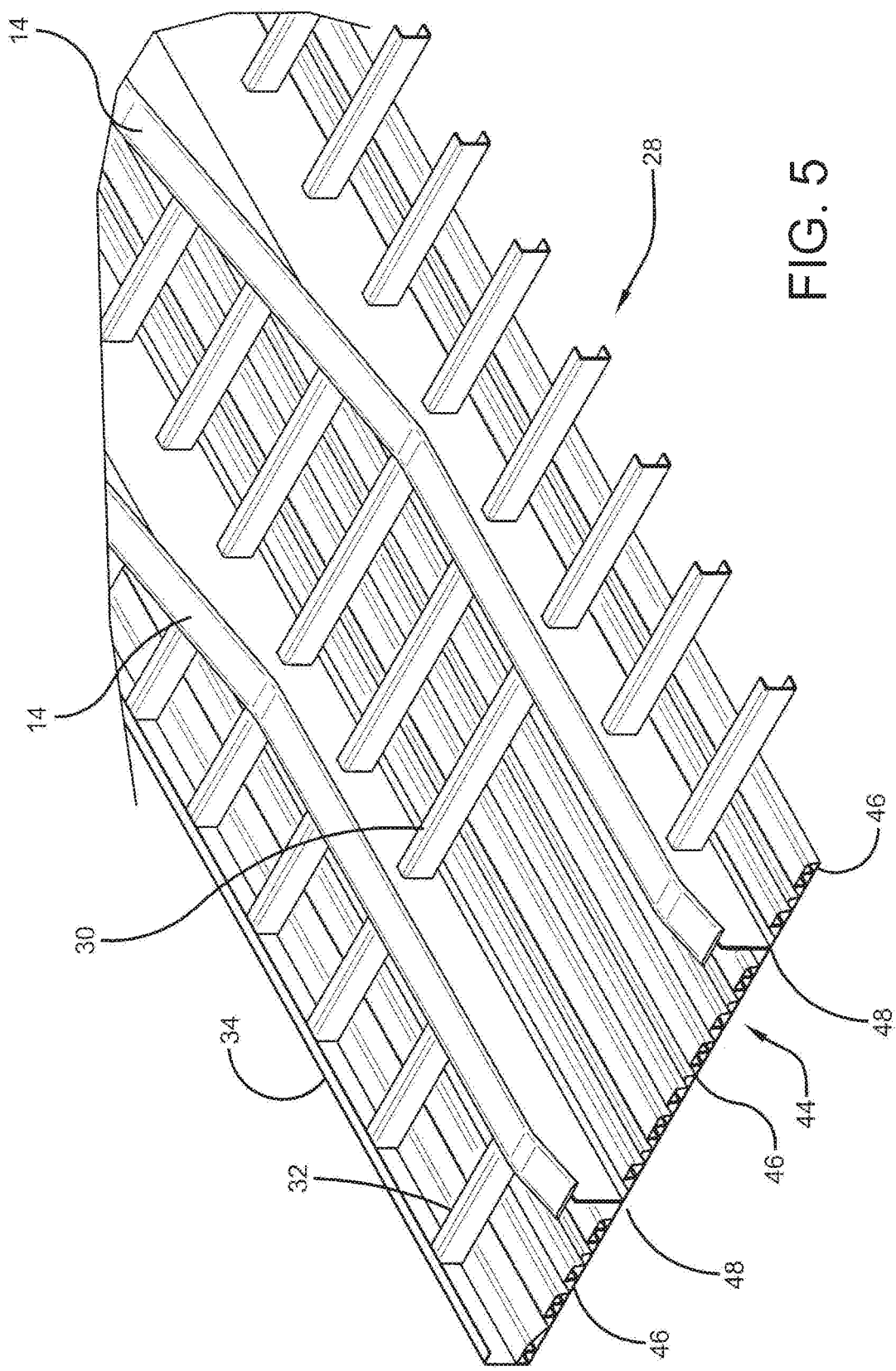
FIG. 5 is a bottom front partial perspective view of the trailer.

Trailer 10 includes a load supporting deck 44. The exemplary deck 44 includes a plurality of longitudinally elongated deck pieces 46. The exemplary deck pieces 46 are arranged in lateral side by side adjacent relation. Deck pieces may extend generally the entire longitudinal length of the vehicle or in selected portions thereof. As shown in FIGS. 4 and 5, the deck pieces extend in supported connection above the central rib portions 30 and the outboard rib portions 32. In the exemplary trailer construction, the upper surfaces 48 of the frame rails 14 extend generally at the same level as the upper surfaces of the deck pieces. As shown in FIG. 5, a plurality of deck pieces extend between the frame rails 14. Further, a plurality of deck pieces extend between each frame rail and each respective side rail 34, 36. Of course it should be understood that this frame and deck construction is exemplary and in other embodiments, other approaches may be used.

Figure 6:
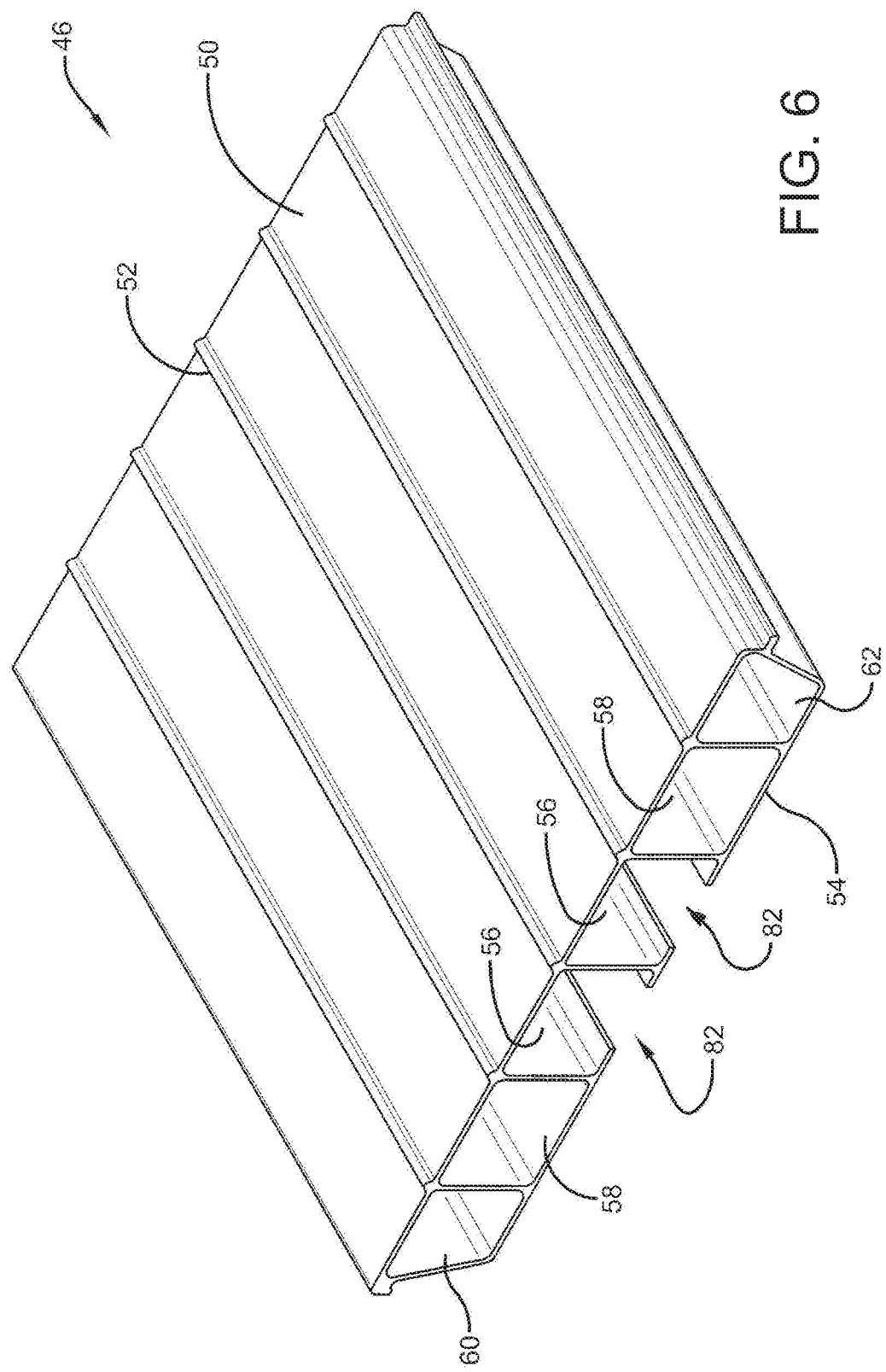
FIG. 6 is a front top perspective view of a portion of an exemplary deck piece utilized in the cargo supporting deck of the exemplary trailer.
Figure 7:
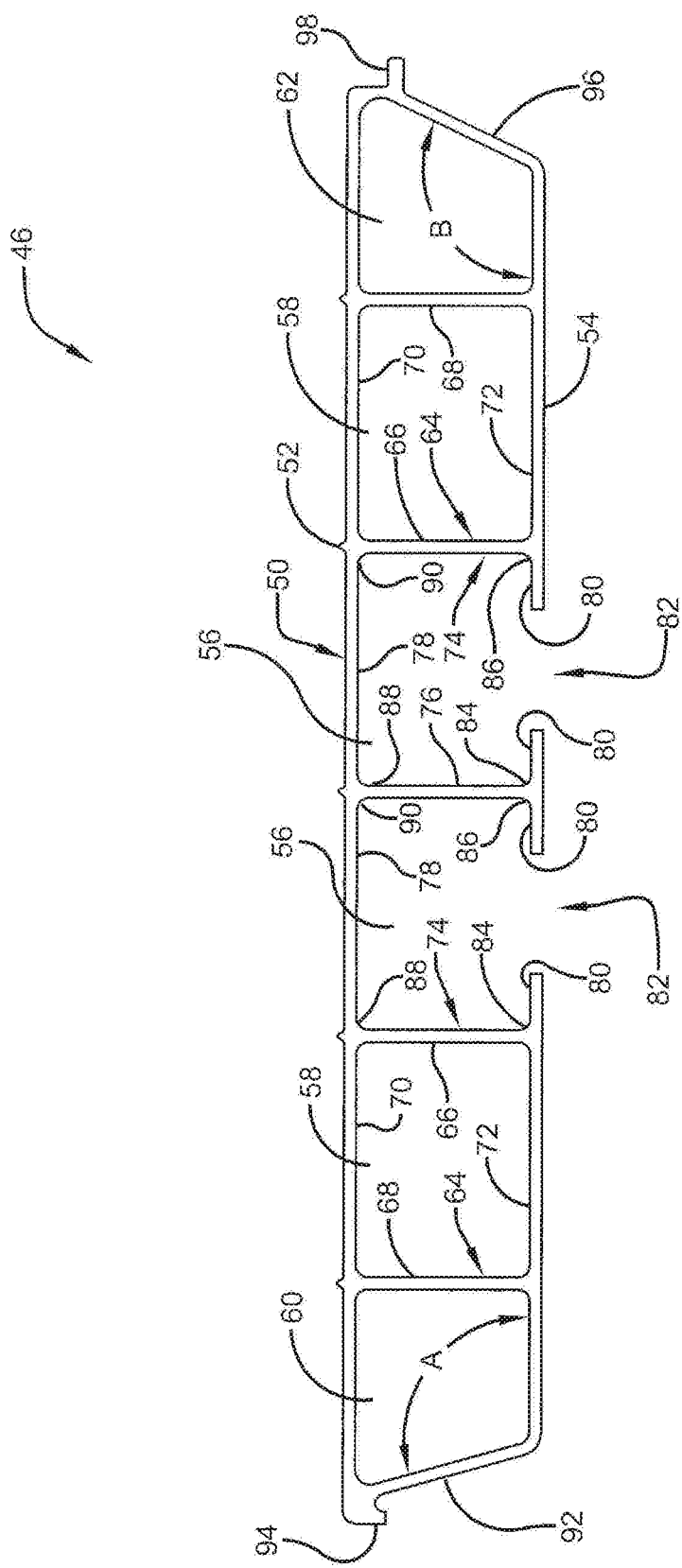
FIG. 7 is a front end view of the exemplary deck piece.

The exemplary deck 44 is comprised of the support deck pieces 46 a portion of which is shown in greater detail in FIGS. 6 and 7. Each deck piece includes a generally planar load engaging surface 50. In the exemplary arrangement, the load engaging surface includes a plurality of transversely spaced ribs 52 that extend outward therefrom. Ribs 52 help to make the load engaging surface 50 less slippery and also help to prevent lateral shifting of cargo items supported on the deck.

The exemplary deck piece further includes a back surface 54. The back surface 54 is disposed away from the load engaging surface 50.

The exemplary deck piece 46 further includes a plurality of laterally disposed cavities 56, 58, 60 and 62. Each of cavities 56, 58, 60 and 62 comprise longitudinally elongated parallel cavities that extend in the deck piece. Such cavities may be formed in exemplary embodiments in a deck piece that is of extruded construction of a suitably strong material such as aluminum 6061 alloy or other material. Of course it should be understood that this construction is exemplary and in other embodiments, other approaches and materials may be used.

The exemplary cavities 58 in transverse cross section comprise rectangular cavities that are bounded by at least one cavity wall surface 64. The cavity wall surface 64 of each cavity 58 includes vertically extending portions 66 and 68. Wall portions 66 extend adjacent to and bound cavities 56. Cavities 58 further include a top cavity wall portion 70 which is positioned adjacent to and beneath the load engaging surface 50. Cavities 58 further include a bottom cavity wall portion 72 which is adjacent to and extends inwardly of back surface 54.

In the exemplary deck piece 46, support cavities 56 in transverse cross section are also generally rectangular in shape. Each cavity 56 is bounded by a cavity wall surface generally indicated 74. In the exemplary arrangement, the cavity wall surface includes the adjacent vertically extending wall portion 66 of adjacent cavity 58. Cavities 56 also include a vertically extending central wall portion 76 that extends between the two cavities 56 in the exemplary embodiment.

Each exemplary cavity 56 further includes a top cavity wall portion 78. Cavity wall portion 78 is adjacent to and disposed inwardly from load engaging surface 50. Each cavity 56 further includes bottom cavity wall portions 80. The bottom cavity wall portions extend inwardly of the back surface 54 and partially across each respective cavity 56.

In the exemplary arrangement, the cavities 56 each include a longitudinally elongated gap 82. Each elongated gap 82 extends in the back wall 54 and into each respective cavity. Each gap is bounded at each lateral side by bottom cavity wall portions 80 which extend laterally from the vertical wall portions 74 and 76.

In the exemplary embodiment, the elongated gaps 82 reduce the amount of material which makes up the deck piece 46 and helps to reduce the weight thereof. Of course it should be understood that this approach is exemplary and in other arrangements, the gaps may extend in additional cavities of a deck piece or alternatively the cavities may not include gaps. Further, in other exemplary embodiments, the cavities that include gaps may not be adjacent to each other in the deck piece.

In the exemplary embodiment the deck pieces are in operatively supported connection with the underlying ribs of the vehicle frame. Further, because the rib portions are welded or otherwise attached thereto, the rib portions constrain the wall portions 72 and 80 and help resist any lateral deformation of the deck portions which further provides enhanced resistance to deformation and greater load bearing capability.

In the exemplary deck piece 46, the at least one cavity wall surface of vertically extending wall portions 74 and 76, and bottom wall portions 80, define corner recesses 84 and 86. In the exemplary arrangement, the corner recesses 84 and 86 are formed as a generally right angle notch in each lateral internal lower side of cavity 56. Further in the exemplary arrangement, each cavity 56 further includes upper corner recesses 88 and 90. Each upper corner recess 88 and 90 is disposed adjacent to load engaging surface 50, and in the operative position of the deck piece 46 are disposed vertically above each of the respective corner recesses 84 and 86. Of course this configuration is exemplary and in other embodiments, other approaches may be used.

In the exemplary deck piece 46, end cavity 60 is generally similar to cavities 58 except that in transverse cross section it includes an angled end wall 92. Angled end wall 92 bounds end cavity 60 and extends from the back surface 54 toward the load engaging surface at an obtuse angle relative to the back surface, generally indicated A. Angled end wall 92 further includes in transverse cross section, a lateral projection 94. Lateral projection 94 is configured to extend in engaged abutting relation with an adjacent deck piece or other structure of the deck or frame.

The exemplary deck piece 46 also includes end cavity 62 at an opposed lateral end from end cavity 60. Similar to end cavity 60, end cavity 62 is bounded by an angled end wall 96. Similar to angled end wall 92 of end cavity 60, angled end wall 96 in transverse cross section extends from the back surface 54 toward the load engaging surface at an obtuse angle relative to the back surface, generally indicated B. Angled end wall 96 further includes a lateral projection 98.

Lateral projection 98 is also configured to extend in engaged relation with the laterally adjacent frame or deck piece similar to deck piece 46. In the exemplary arrangement, lateral projection 94 is configured to vertically overlie lateral projection 98 of an adjacent deck piece. Such overlying relation helps to laterally position the deck pieces and avoid vertical gaps that would otherwise extend between the adjacent deck pieces. Of course, this configuration is exemplary and in other embodiments, other approaches may be used.

The exemplary end cavities 60 and 62 of the deck piece 46 and angled wall portions 92 and 96 thereof are so configured to reduce the amount of material that is included in each deck piece and to reduce the weight thereof. Of course it should be understood that in other embodiments, other configurations of the end cavities or other deck piece structures may be utilized for purposes of reducing weight or providing suitable strength and crush resistance.

Figure 8:
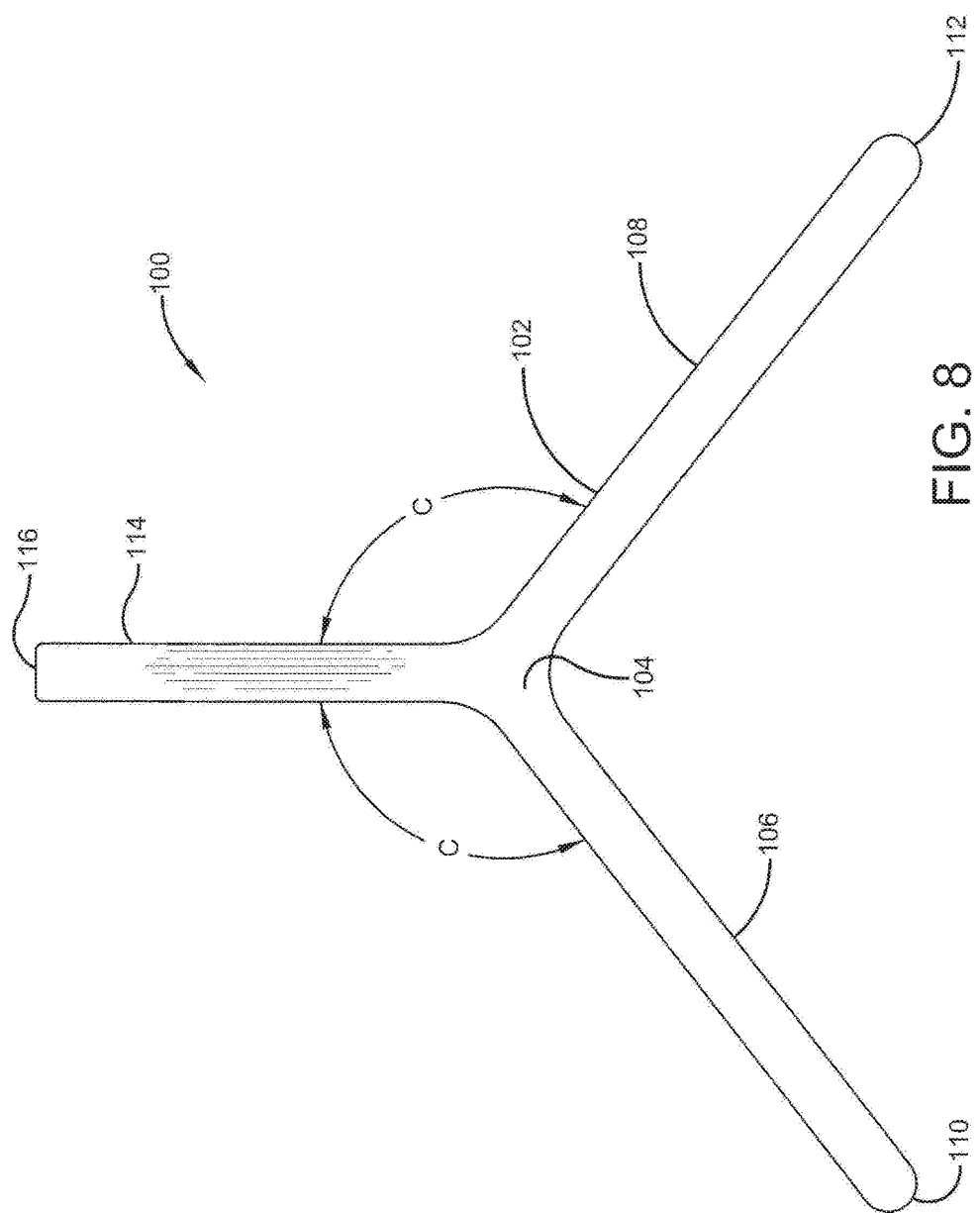
FIG. 8 is a front view of an exemplary support member used in conjunction with the deck piece.

In exemplary embodiments, cavities 56 of the deck piece 46 are configured to accept therein a respective support member 100. As shown in transverse cross section in FIG. 8, the exemplary support member 100 is comprised of a unitary body 102 which includes a central apex portion 104. A pair of divergent legs 106, 108 extend outward in a first direction from apex portion 104. The exemplary leg 106 terminates in a rounded distal end 110 while leg 108 terminates at a rounded distal end 112. In the exemplary embodiment, the legs 106 and 108 are divergent at an angle of approximately 105 degrees. Of course this configuration is exemplary.

The exemplary support member further includes a central strut 114. The central strut extends from the apex portion 104 in a second direction opposed of the first direction and terminates at a generally flattened distal end 116. The central strut 114 extends at a common angle generally indicated C relative to each of legs 106 and 108. In the exemplary embodiment, the common angle C is about 127 degrees. Of course this configuration is exemplary.

Figure 9:
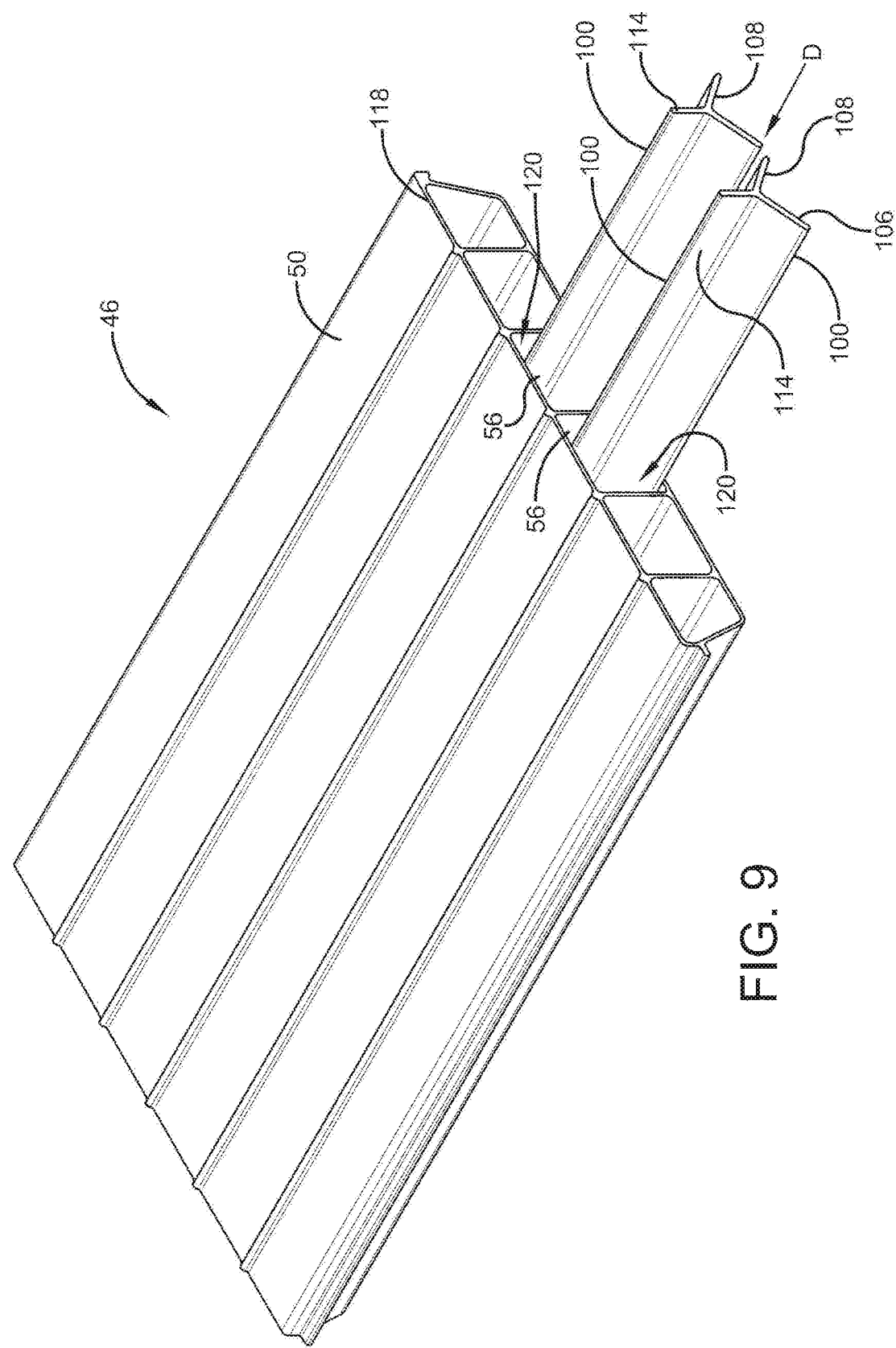
FIG. 9 is a left front top perspective view of an exemplary deck piece with support members extending in elongated cavities therein.
Figure 10:
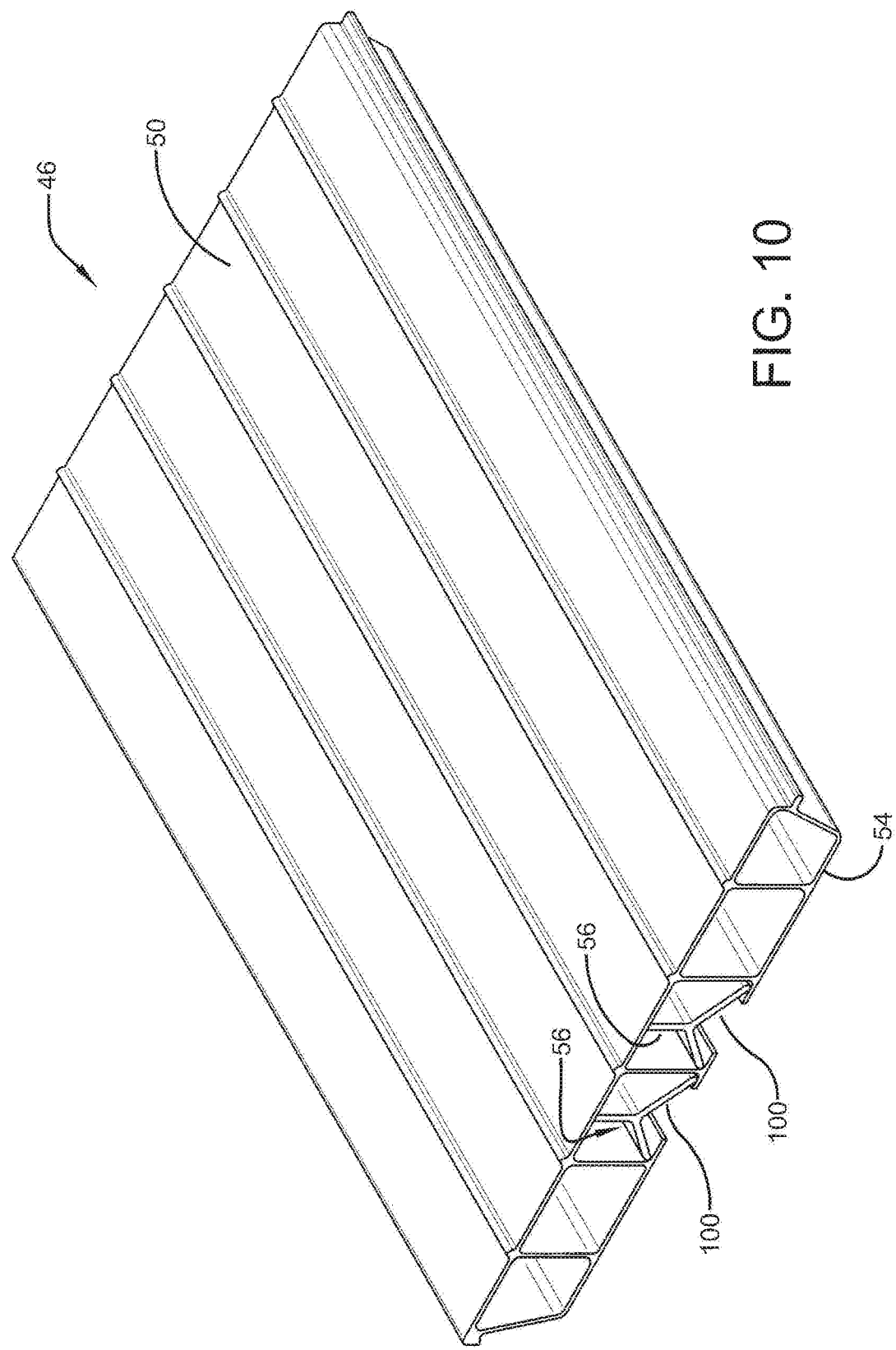
FIG. 10 is a right front top perspective view of the deck piece with the support members positioned therein.
Figure 11:
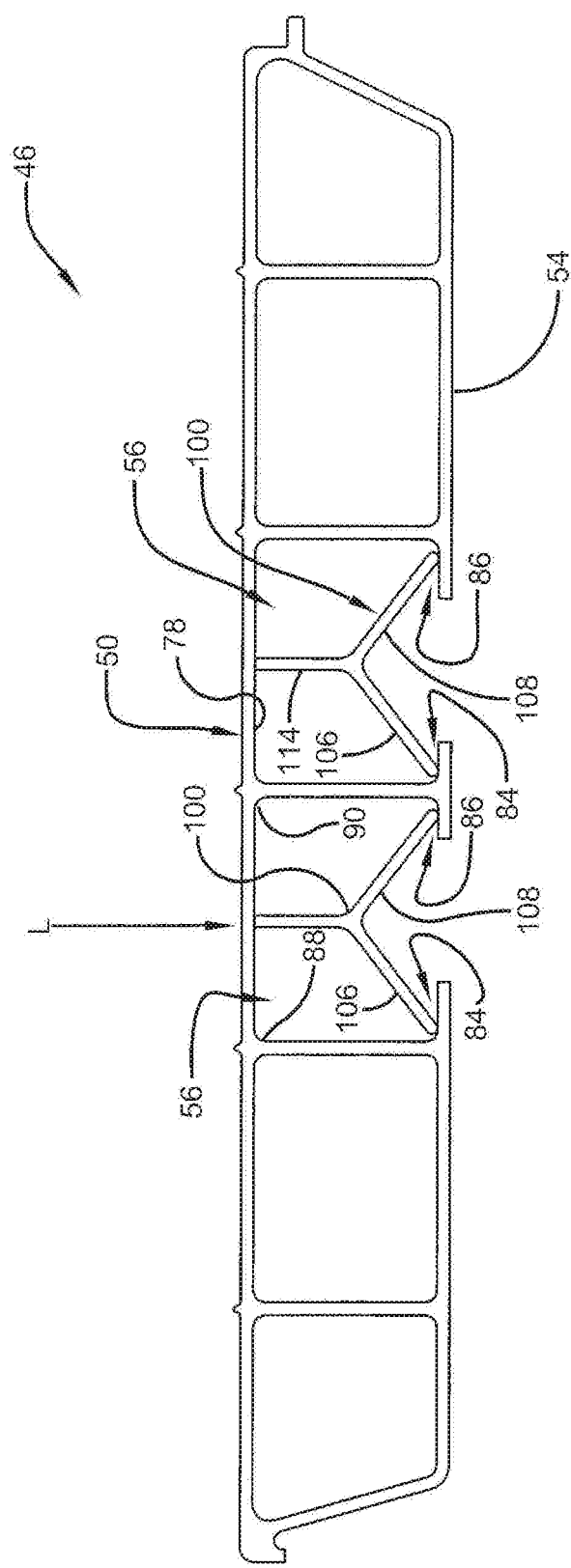
FIG. 11 is a front end view of the exemplary deck piece with the support members positioned therein.

As shown in FIGS. 9 and 11, the exemplary support members 100 are configured to be selectively longitudinally movably positionable within each cavity 56 of the deck piece 46. As shown in FIG. 9, deck piece 46 at a longitudinal end thereof 118 provides an opening 120 into each cavity 56. Each support member 100 is insertable into a respective cavity 56 through the respective cavity opening. As shown in FIGS. 9-11, the support members 100 are inserted such that the ends 111, 112 of legs 106 and 108 extend in longitudinally movable relative contacting relation with the corner recesses 84 and 86 of each cavity. In the exemplary arrangement, the leg ends are enabled to slide in the respective corner recesses longitudinally In the exemplary arrangement, the flattened end 116 of the central strut 114 engages the top cavity wall portion 78 of the cavity 56 in which the support member is positioned. The central strut end engages the top cavity wall portion intermediate of the corner recesses 88 and 90 which bound each cavity. In the exemplary arrangement, the central strut engages the top cavity wall portion generally at the midpoint between the top corner recesses 88 and 90. Of course it should be understood that this configuration is exemplary and in other embodiments, other approaches may be used.

Each elongated support member is longitudinally extended within a respective cavity 56 so that the support members are positioned within the cavities as shown in FIG. 10. In exemplary arrangements, the support members may extend the entire length of the cavity 56. Alternatively the support members may be included only in those longitudinal areas of the cavity 56 where a high load is applied and where additional strength and crush resistance are required. For example, in some exemplary arrangements the support members may be pushed longitudinally inwardly into the respective cavity using a suitable dowel or other structure extended through the end opening until the support member is positioned in the desired longitudinal location within the deck piece. Further, as can be appreciated, the support members may be positioned in the same longitudinal region for all adjacent deck pieces based on the need to have crush resistance and added support in common load areas of the trailer deck. Alternatively the load areas may be disposed in various disposed locations of the deck and the support members may be arranged in different longitudinal positions for purposes of better supporting the load in such disposed areas. Of course the approach that is taken will depend on the particular load bearing requirements of the particular cargo supporting deck structure.

Figure 12:
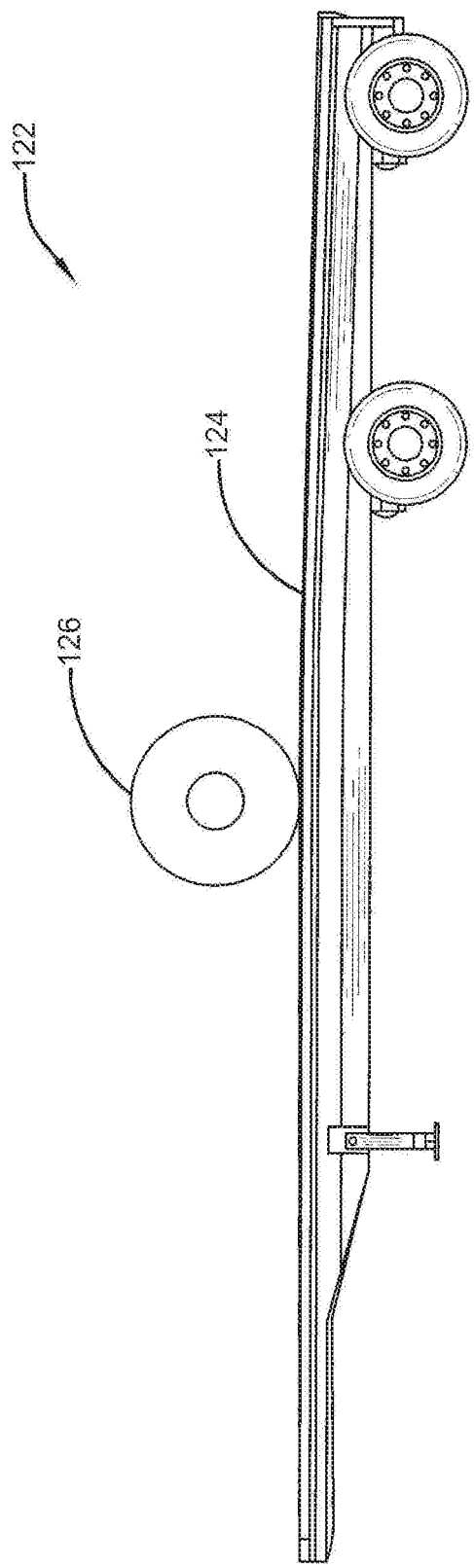
FIG. 12 is a side view of an exemplary trailer carrying cargo in the form of a round coil such as a steel coil or similar article.
Figure 13:
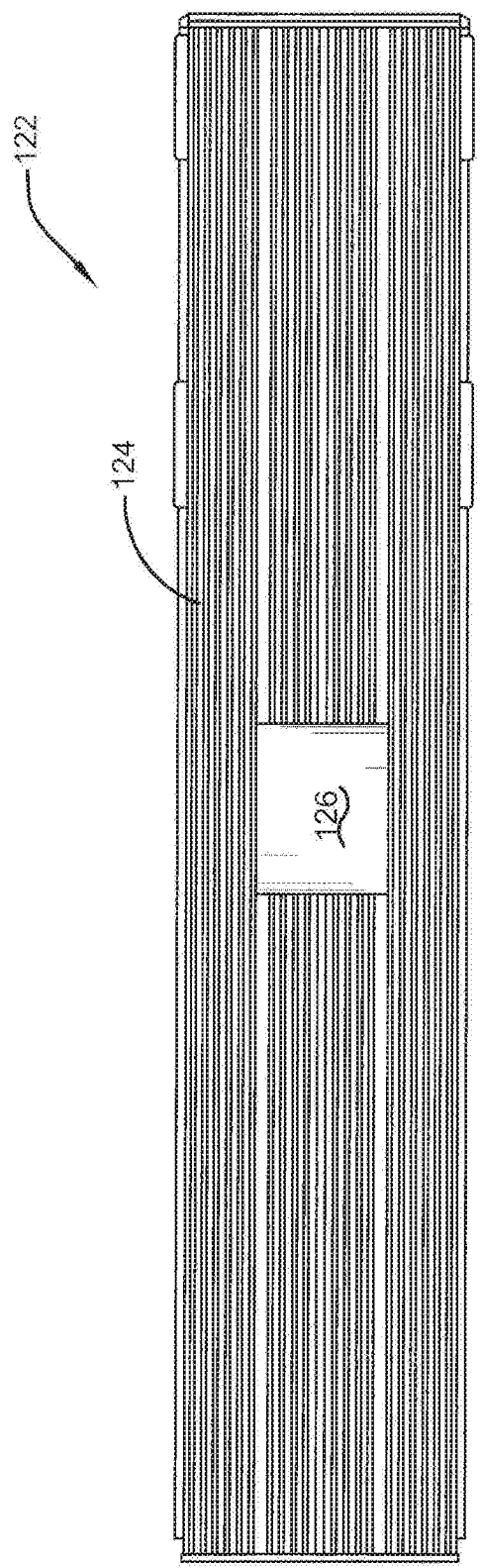
FIG. 13 is a top view of the trailer and cargo shown in FIG. 12.
Figure 14:
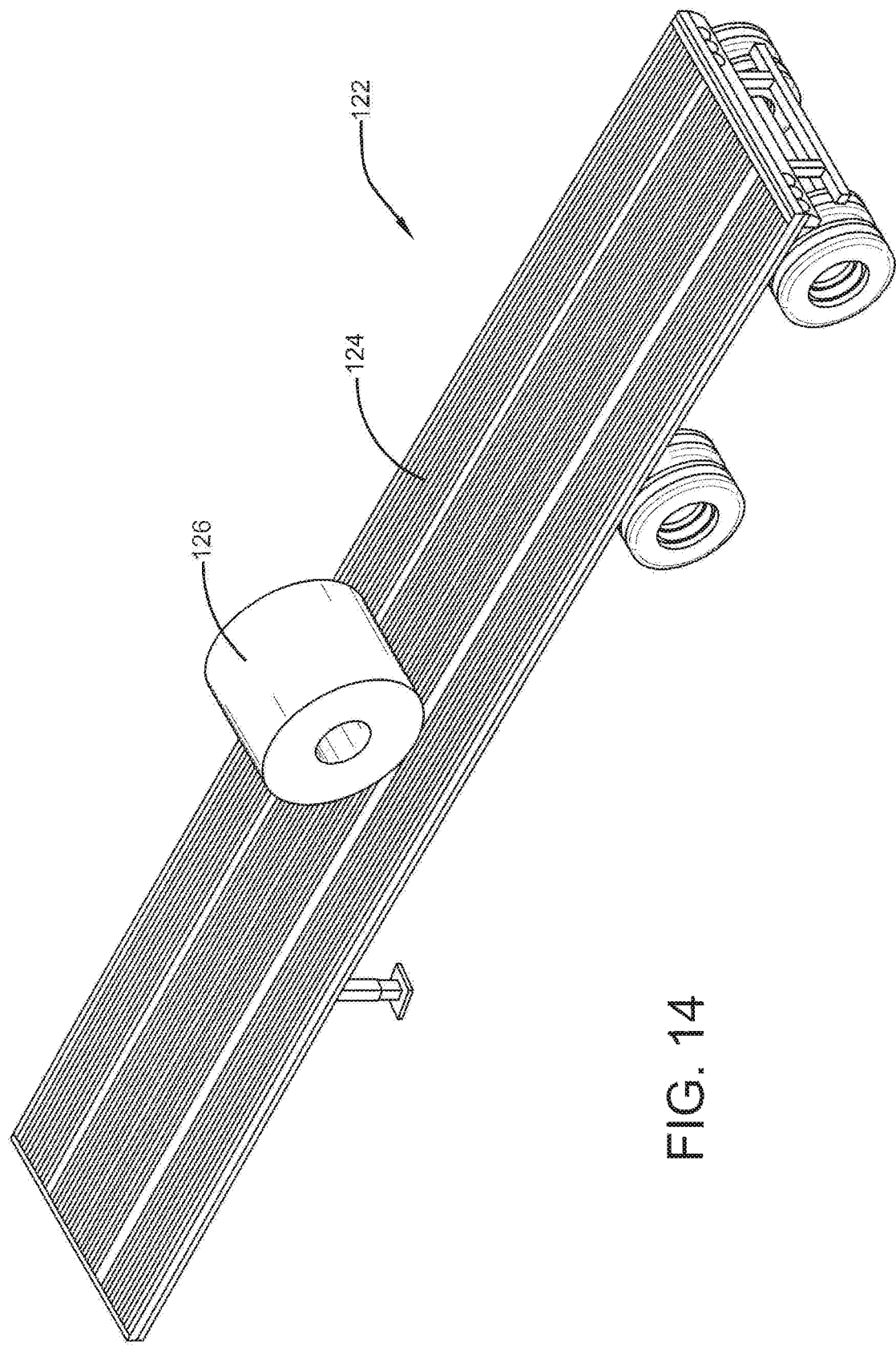
FIG. 14 is a right rear top perspective view showing the trailer and the cargo of FIG. 12.

FIGS. 12-14 demonstrate the principles of the exemplary embodiment applied in an exemplary load supporting application. FIGS. 12-14 show a trailer 122. Trailer 122 is generally similar to trailer 10 except as otherwise specifically described. Trailer 122 includes a load supporting deck 124. Load supporting deck in the exemplary embodiment is comprised of deck pieces similar to deck pieces 46 previously described.

Trailer 122 includes a concentrated load 126 in engagement with the deck 124 and the load supporting surfaces 50 of the deck pieces. In the exemplary arrangement, the load 126 may include a heavy steel coil or other relatively massive load that has its weight concentrated in a relatively small area of the load supporting deck 124.

The force resulting from gravity on the load 126 acts on the load engaging surface 50 of the deck pieces in a load area as represented by Arrow L in FIG. 11. As can be appreciated, the load in the exemplary arrangement is distributed over a relatively small lateral and longitudinal area relative to the overall surface area of the load supporting deck 124. In this exemplary arrangement, the cavities and support members which underlie the load area provide additional strength and rigidity to the deck. The deck piece cavity and support structures also provide enhanced crush resistance and avoid the deformation thereof in the load area.

Further, as can be appreciated from this example, such additional strength and crush resistance may only be necessary in the load area where the force of the load 126 is applied. As a result, the support members may not be required in the cavities in other areas of the deck pieces that are disposed away from the load area. The ability of the exemplary embodiment to avoid the need for the additional weight of the support members where the additional strength and crush resistance is not needed, reduce the weight of the trailer or other cargo carrying vehicle which provides for improved fuel economy and other desirable properties.

As can be appreciated, different types of cargo carrying vehicles may have load areas in numerous different areas of the cargo supporting deck or other load supporting structures. The exemplary embodiments enable the load supporting areas to be reinforced by the inclusion of the support members within the cavities of the deck piece structures in the areas where support is needed. Further, such support members can be selectively arranged so as to provide the additional strength in the areas where it is needed.

Further, in exemplary embodiments the cargo supporting deck pieces can have the support members initially arranged and/or reconfigured as necessary to help strengthen the load areas that require additional support due to the need to haul different arrangements or types of cargo. The exemplary arrangements enable the support members to be positioned, and also removed and repositioned so as to provide the additional support in load areas that require itfor different cargo configurations. This enables the structure of some exemplary embodiments to be more versatile and used for moving more types of cargo while maintaining the strength and rigidity of the vehicle structure.

It should be understood that while in the exemplary embodiments the deck pieces include cavities that are generally rectangular in transverse cross section, in other embodiments other cavity configurations and arrangements may be used. Such cavities may have other shapes which are sized and suitably configured for receiving selectively positionable longitudinal support members. Further, it should be understood that the configuration of the support members including the pair of divergent legs and central strut is exemplary of support structures that may be utilized. Other support structure configurations may be utilized for purposes of providing contacting relation in a plurality of locations with at least one cavity wall that bounds a particular cavity. Such support members may include other different configurations in transverse cross section such as V-shaped members, diamond shaped members, triangular shaped members, I-beam shaped members, or other members that are suitable for providing additional support at selected longitudinal locations within the cavity configuration. In exemplary arrangements, the support members may comprise structures comprised of a plurality beam portions and/or hollow cross sections to supply support while minimizing the weight of the support members.

In other exemplary embodiments, support members like that shown in the previously described exemplary embodiment may be used in an orientation that is inverted from the orientation previously shown. For example, the divergent pair of legs may be oriented so as to extend upwardly from an apex portion which is the area of the support member where the legs of the support member come together. Further in some alternative exemplary arrangements support pieces may be configured in a V shape with the legs extending in a direction either upwardly or downwardly from the apex portion. In such arrangements in lieu of a central strut, the apex portion may define an end on an opposed side of the legs that is in contacting longitudinally movable relation with an adjacent laterally extending surface of a cavity wall. In some exemplary arrangements where the at least one wall bounding the cavity includes a gap, the laterally extending surface in engagement with the end disposed at the apex portion, may be on a side of the cavity that is vertically opposite the gap. In other exemplary arrangements support members may include leg portions or member portions that are curved, straight or that include members that are both curved and straight. Numerous different support members and corresponding cavity shapes may be utilized.

Further in some arrangements deck pieces may be utilized that include cavities in transverse cross section that serve to provide cavities for gas flow, cooling or other functions that are useful in connection with the particular cargo that is to be supported by the deck piece. For example in some container arrangements it may be useful to enable the air or other gas within the container to be in contact with more of the material supported on the support deck than would otherwise occur in a configuration where the support deck includes a generally laterally continuous load engaging surface. In such arrangements deck support pieces may include longitudinally elongated cavities that include laterally spaced longitudinal gaps in a cargo supporting surface thereof. In such arrangements support members may be positioned in such cavities to provide additional strength and crush resistance to the load supporting deck while enabling substantial portions of the supported load to have the elongated gaps in underlying relation thereof. For example in some arrangements the deck support pieces previously described may be inverted to have elongated gaps underlying the load to achieve this configuration. Alternatively in other arrangements other configurations may be used.

Further exemplary arrangements may include other or additional features for providing weight savings for load supporting deck pieces. Such features may include, for example, different configurations of gaps which are included in the back surface or other surfaces so as to reduce the amount of material and weight thereof. Further other exemplary deck piece structures may include angled wall surfaces or other surface configurations that provide suitable support while reducing the amount of material and weight needed for the cargo supporting structure. Numerous different configurations and arrangements may be devised for different types of cargo supporting arrangements based on the teachings provided herein to produce suitable load supporting structures for the transport of various types of cargo by vehicles of various structures and arrangements.

FIGS. 15 through 27 show an exemplary arrangement for a trailer reinforcing and suspension supporting arrangement. This exemplary arrangement may be used in conjunction with trailer 10 as previously discussed, or may be used in conjunction with other types of cargo carrying vehicles.

Figure 15:
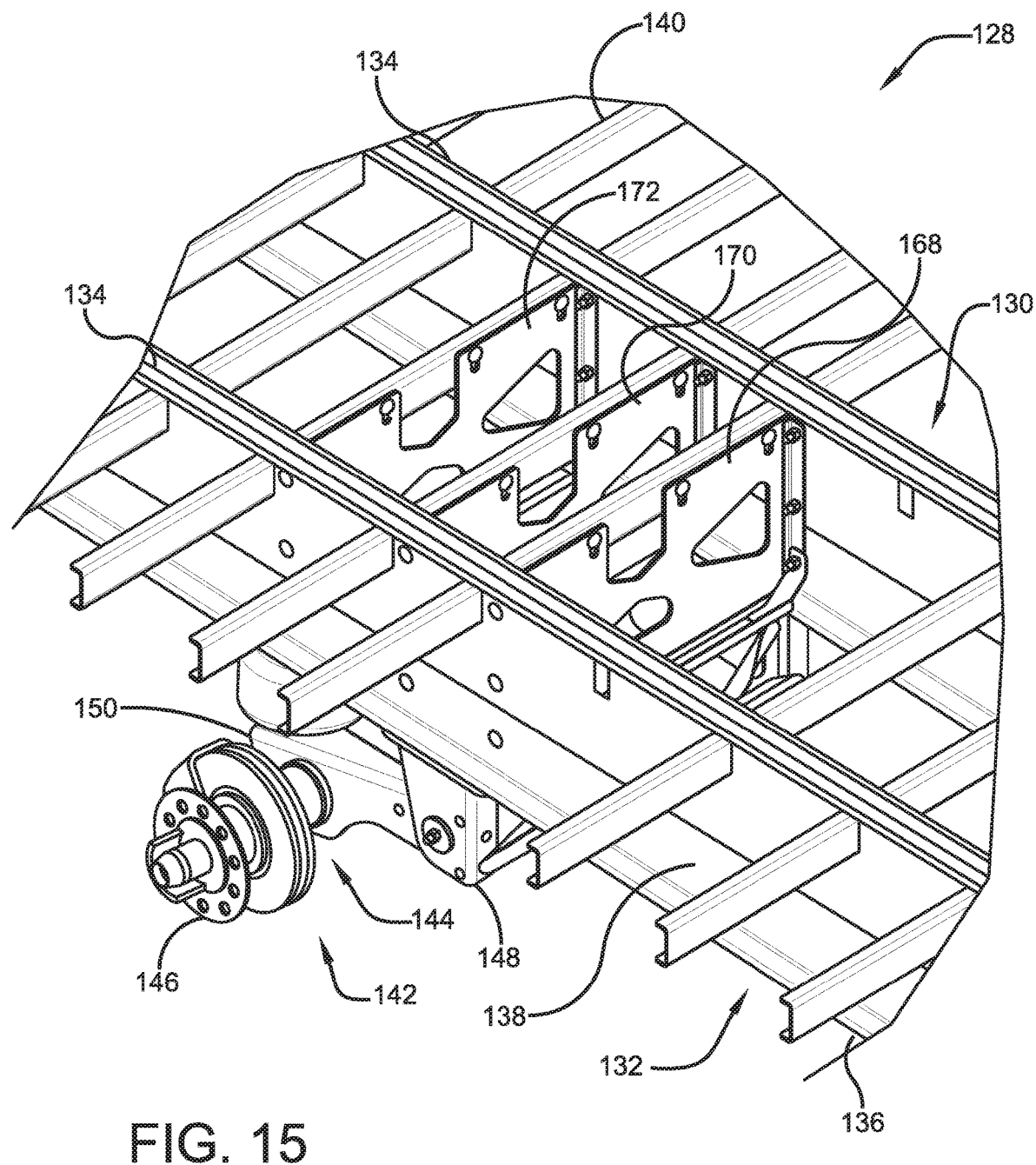
FIG. 15 is a perspective view of an alternative trailer frame with the deck pieces removed and including an exemplary reinforcing and suspension supporting arrangement.

FIG. 15 shows a frame 128 of a cargo carrying vehicle such as a semi trailer. Frame 128 may include features similar to those discussed in connection with frame 12 of the previously described embodiment. Frame 128 is shown without the load supporting deck pieces installed thereon. Frame 128 includes laterally disposed frame rails 130, 132. Frame rails 130, 132 are longitudinally elongated and extend generally the full longitudinal length of the frame 128.

In the exemplary arrangement the frame rails are the same. Each frame rail includes an upper frame rail flange 134 and a lower frame rail flange 136. In transverse cross section the upper frame rail flange 134 and lower frame rail flange 136 of each frame rail are connected by a web 138. Each of the exemplary frame rail flanges are laterally elongated and centered in transverse cross section relative to the web 138. The exemplary web provides a generally flat surface that is used to connect to the structures included in the exemplary reinforcing and suspension supporting arrangement as discussed herein.

The exemplary frame 128 includes a plurality of laterally extending support ribs 140. The support ribs 140 are parallel and longitudinally spaced from one another. Each of the support ribs 140 is in operatively fixed connection with each of the frame rails 130 and 132. The support ribs and frame rails may be connected by welding, fasteners or other suitable fastening methods. The support ribs 140 may be used to support deck pieces of the type previously described or other materials which are used to support a load on the frame.

In the exemplary embodiment the frame is in operative connection with a suspension arrangement. In the exemplary embodiment shown the suspension arrangement includes a suspension subframe 142. This exemplary suspension subframe 142 includes an axle 144. The exemplary axle extends laterally across the frame 128 perpendicular to the longitudinal frame rails 130, 132. Each lateral end of the axle is in operative connection with a rotatable hub 146. Each rotatable hub is configured to have a wheel releasably mounted thereto through wheel nuts, studs or other suitable fastening methods. Exemplary embodiments may include one or more of such suspension subframes and axles.

The exemplary suspension subframe 142 further includes a pair of laterally disposed anchor posts 148. Each anchor post has a rotatably movable trailing arm 150 in connection therewith. Each trailing arm includes a front end 152 that is rotatably connected to a respective anchor post via a pivot connection 154 (see FIGS. 16 and 19). Each trailing arm also includes a rear end 155. Each rear end is in operative connection with the axle 144. The exemplary rear end has a laterally enlarged top surface 156. Top surface 156 is in operative abutting engagement with a respective compression spring 158. In the exemplary embodiment the compression spring comprises an air spring. A pair of air springs are used to movably support the axle, with one spring positioned on each lateral side of the frame 128. Of course it should be understood that this arrangement is exemplary.

Figure 17:
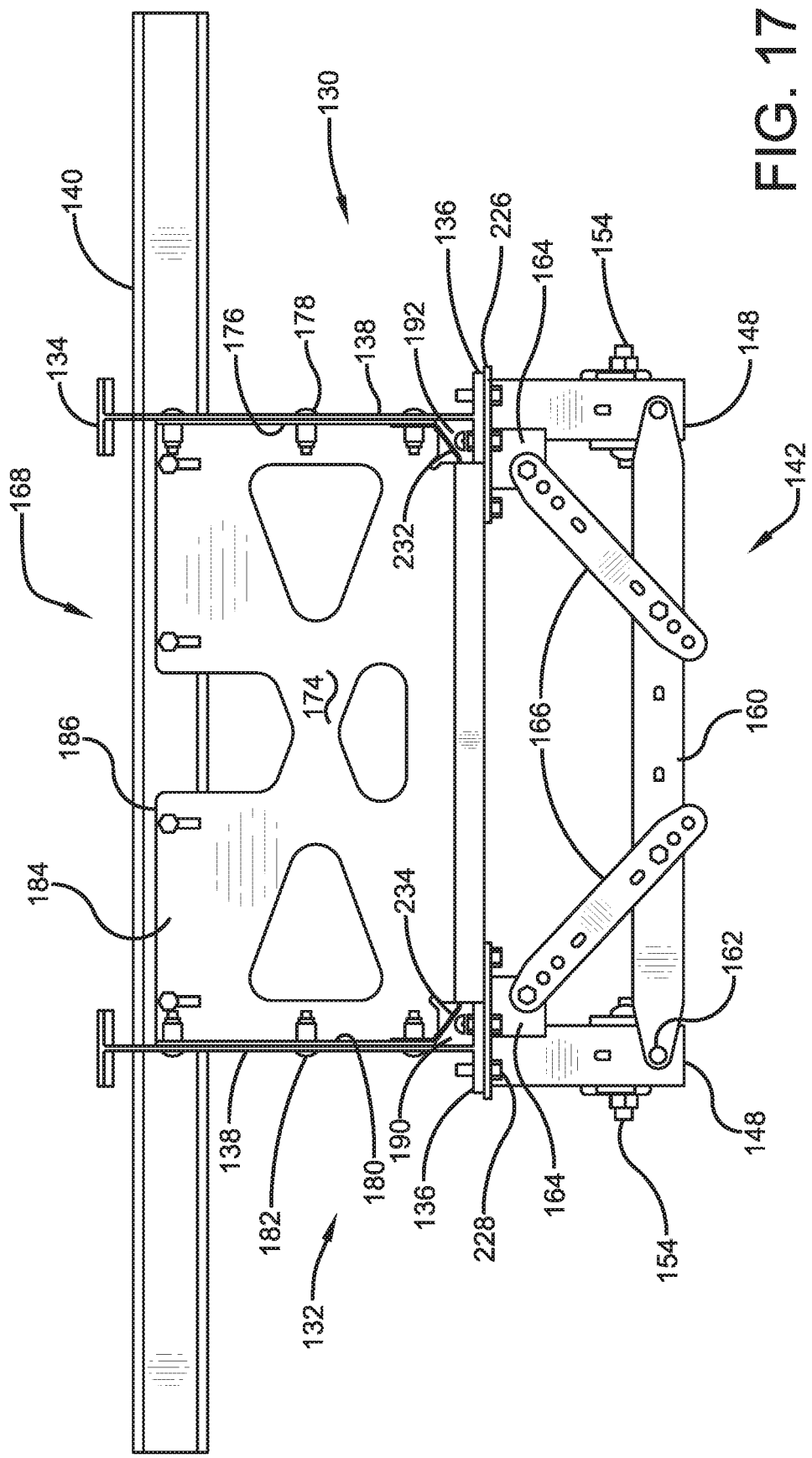
FIG. 17 is a front view of an exemplary brace plate and suspension subframe of the exemplary reinforcing and supporting arrangement.
Figure 18:
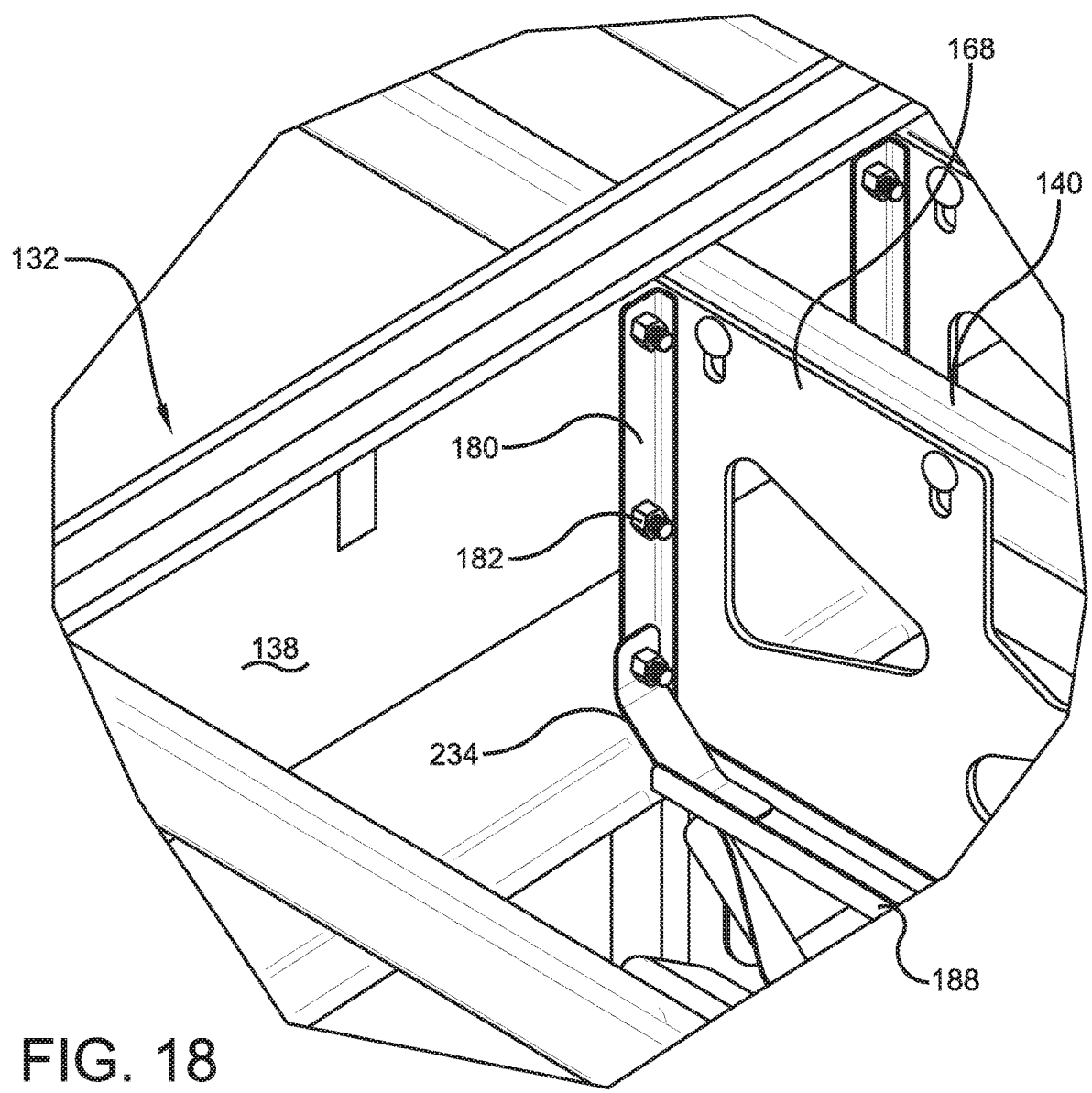
FIG. 18 is a perspective view showing attachment of an exemplary brace plate to a trailer frame rail and suspension subframe.

As shown in FIG. 17 the exemplary suspension subframe further includes a tie bar 160. The exemplary tie bar 160 extends laterally between the anchor posts 148. The tie bar 160 is attached to the lower end of each anchor post via fasteners 162. In the exemplary arrangement each anchor post includes in connection therewith a strut plate 164. Each strut plate 164 extends laterally inwardly from the respective attached anchor post 148. The strut plates 164 may be in fixed attached relation with the anchor posts through welding or other suitable fastening methods. Each strut plate 164 is operatively engaged with a respective strut 166. Each strut extends diagonally inwardly from the strut plate and is in attached connection with the tie bar 160. Each strut is attached to the tie bar through fasteners or other suitable attaching methods. Of course this arrangement of the suspension subframe 142 is exemplary and in other embodiments other arrangements may be used.

The exemplary reinforcing and suspension supporting arrangement includes a plurality of brace plates 168, 170 and 172. It should be appreciated that while three brace plates are used in the exemplary arrangement, other arrangements may use a different number of brace plates. In the exemplary arrangement each of the brace plates are the same and so only one will be described herein in detail.

As shown in FIG. 17 brace plate 168 of the exemplary embodiment has a generally rectangular structure. In the exemplary arrangement the brace plate is formed from a single metal plate. The exemplary brace plate may be comprised of aluminum or other suitable material having sufficient strength for purposes of providing the reinforcing and supporting functions described herein.

Brace plate 168 includes a generally planar central portion 174. A first side flange 176 extends at a first lateral side of the brace plate. The first side flange 176 extends perpendicular to the central portion 174 and is elongated longitudinally for purposes of extending in abutting engagement with the web 138 of frame rail 130. The first side flange 176 is held in fixed engagement with frame rail 132 by a plurality of fasteners 178. Brace plate 168 further includes a second side flange 180. The second side flange 180 is similar in configuration to first side flange 176 and extends in abutting adjacent relation with the web 138 of frame rail 132. The second side flange 180 is engaged with the second frame rail through a plurality of fasteners 182.

Figure 22:
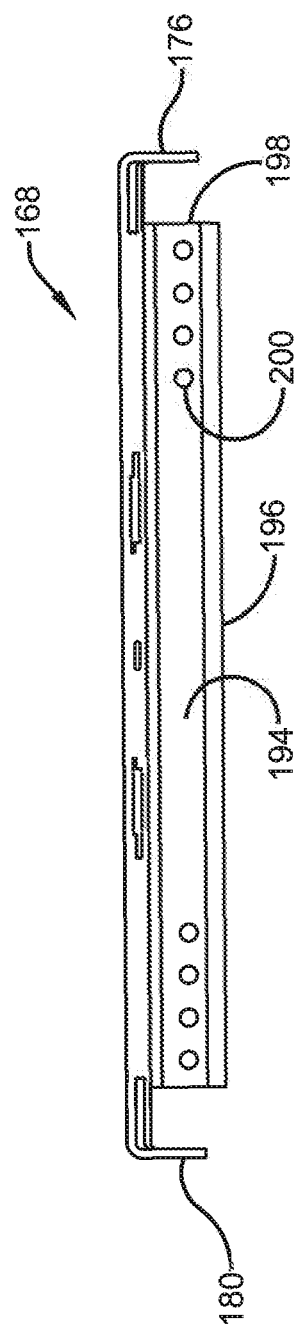
FIG. 22 is a top view of the brace plate.
Figure 23:
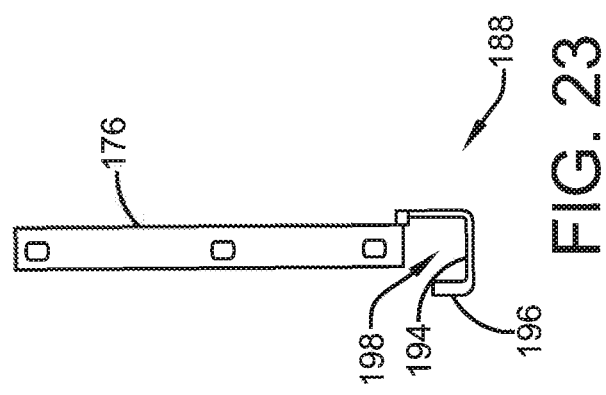
FIG. 23 is a right side view of the brace plate.
Figure 21:
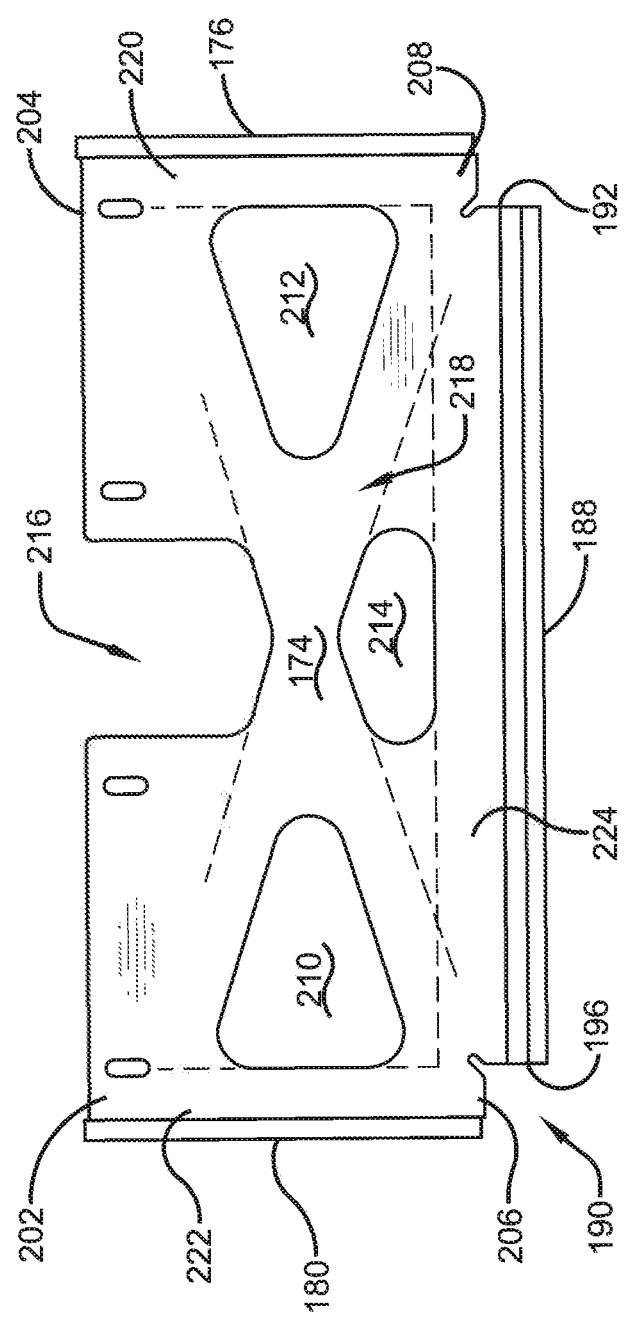
FIG. 21 is a front view of an exemplary brace plate.

The exemplary brace plate 168 further includes an upper edge area 184. The upper edge area 184 of the brace plate is held in operative fixed engagement with an adjacent support rib 140 through fasteners 186. Brace plate 168 further includes a bottom flange 188. The bottom flange extends between lower cutouts 190, 192 in the central portion. As shown in FIG. 23 the bottom flange 188 of an exemplary embodiment includes a bottom side 194. The bottom side 194 extends perpendicular to the central portion 174 of the brace plate. The bottom side 194 in transverse cross section terminates in an upturned end 196. In the exemplary arrangement the bottom flange is configured so that the lower portion of the brace plate, the bottom side 194 of the bottom flange and the upturned end 196 bound a channel 198. In the exemplary arrangement the channel 198 extends laterally between the lower cutouts 190, 192 of the brace plate. As shown in FIG. 22 the bottom side 194 of the bottom flange includes openings 200 configured for accepting fasteners to facilitate attachment of components to the bottom flange and within the channel in the manner later discussed.

In the exemplary arrangement the brace plates include a plurality of openings that extend through the central portion 174. The arrangement of the openings of the exemplary brace plate reduce the weight of the brace plate while leaving solid material in regions of the brace plate that enable the brace plate to provide sufficient vertical, horizontal and lateral strength to perform the desired reinforcement and supporting functions. The exemplary openings further provide for the passage of air through the brace plate to reduce wind resistance when the trailer is moved at highway speeds.

In the exemplary arrangement the central portion 174 comprises a generally planar rectangular area that includes laterally disposed upper corner areas 202, 204. The central portion further includes laterally disposed lower corner areas 206, 208. In the exemplary arrangement the central portion of the brace plate includes openings 210, 212 and 214 therethrough. The exemplary embodiment further includes a laterally central upper cut out 216 in the central portion 174 of brace plate 168. This exemplary arrangement of openings provide solid material in a region 218 in the shape of an X as represented by the dashed lines in FIG. 21. This X shaped region 218 of solid material is centered at the central portion of the brace plate and extends outward to the respective upper and lower corner areas 202, 204, 206 and 208. In the exemplary arrangement this configuration provides lateral and vertical resistance to deformation.

However this arrangement is exemplary and in other embodiments other approaches may be used.

Further in the exemplary arrangement brace plate 168 includes a first rectangular strip 220 of solid material at a first lateral side of the central portion. Strip 220 shown in phantom in FIG. 21 extends laterally inward from the first side flange 176 and between upper corner area 204 and lower corner area 208. A second rectangular strip 222 without openings therethrough extends on an opposed side of the central portion 174 as shown in phantom in FIG. 21. Second strip 222 extends laterally inward from second side flange 180 and between upper corner area 202 and lower corner area 206. A rectangular bottom strip 224 shown in phantom in FIG. 21 comprises a strip of solid material that extends vertically upward above the bottom flange 188 and that extends laterally between the lower corner areas 206, 208. It should be noted that in the exemplary embodiment the first strip 220, the second strip 222 and the bottom strip 224 overlap with the material of the X shaped region 218 at all four corners. These overlapping strips of solid material provide for sufficient strength and resistance to deformation of the brace plate while also reducing weight and wind resistance. Of course it should be understood that these approaches are exemplary and other embodiments other approaches may be used.

Figure 20:
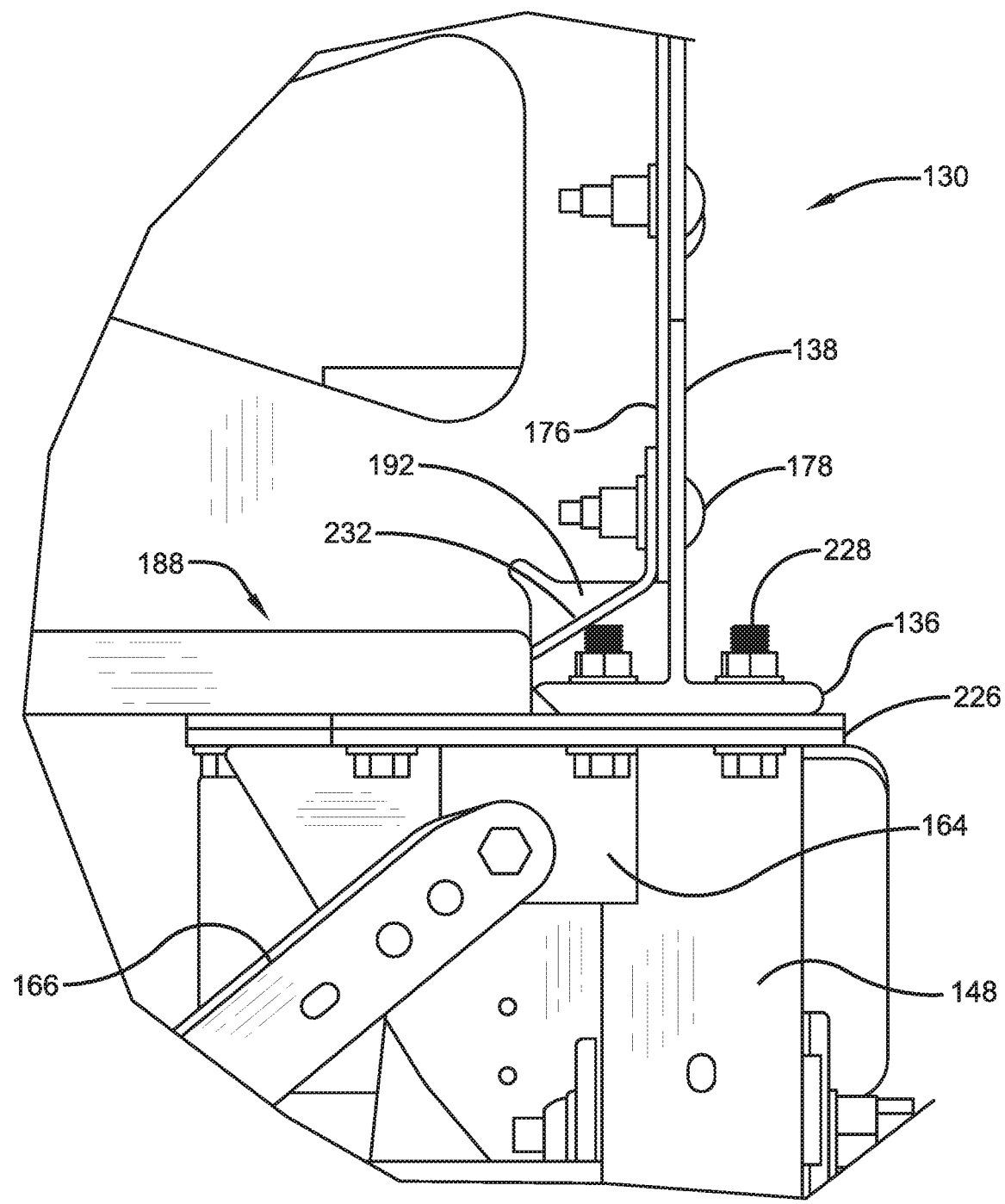
FIG. 20 is a front view showing attachment of an exemplary brace plate to a frame rail, anchor plate and suspension subframe.

As shown in FIGS. 17 and 20 in the exemplary arrangement each anchor post 148 is attached to an anchor plate 226. An anchor plate 226 extends at each lateral side of the frame below each respective lower frame rail flange 136 of frame rails 130 and 132. Each respective anchor post 148 is attached to the anchor plate 226 and the lower frame rail flange 136 by fasteners 228. In the exemplary arrangement fasteners 228 extend in the lower frame rail flange 136 on each lateral side of the web 138 of the frame rail.

Figure 19:
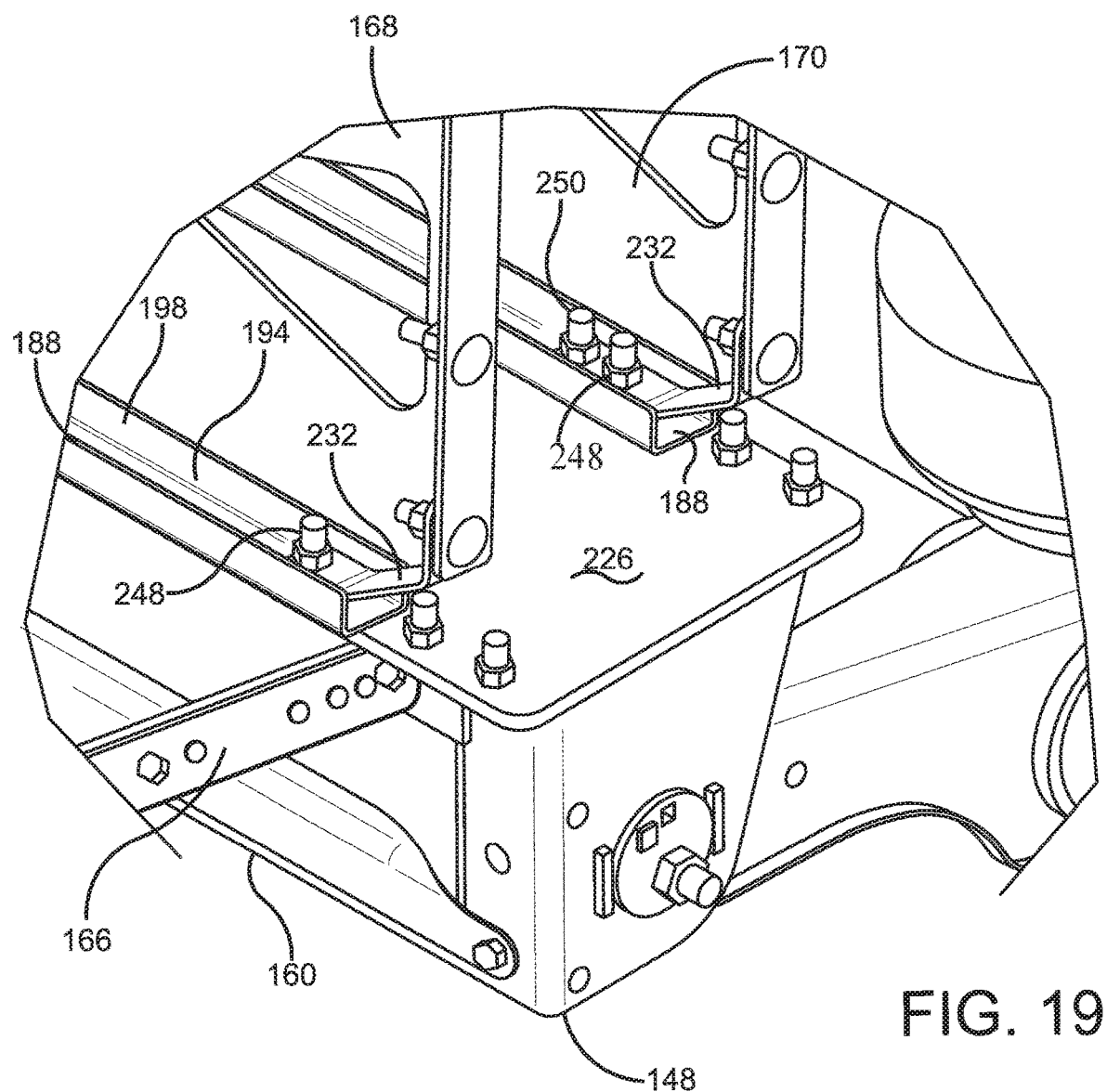
FIG. 19 is a perspective view of first and second brace plates attached to an anchor plate and anchor post of a suspension subframe.
Figure 24:
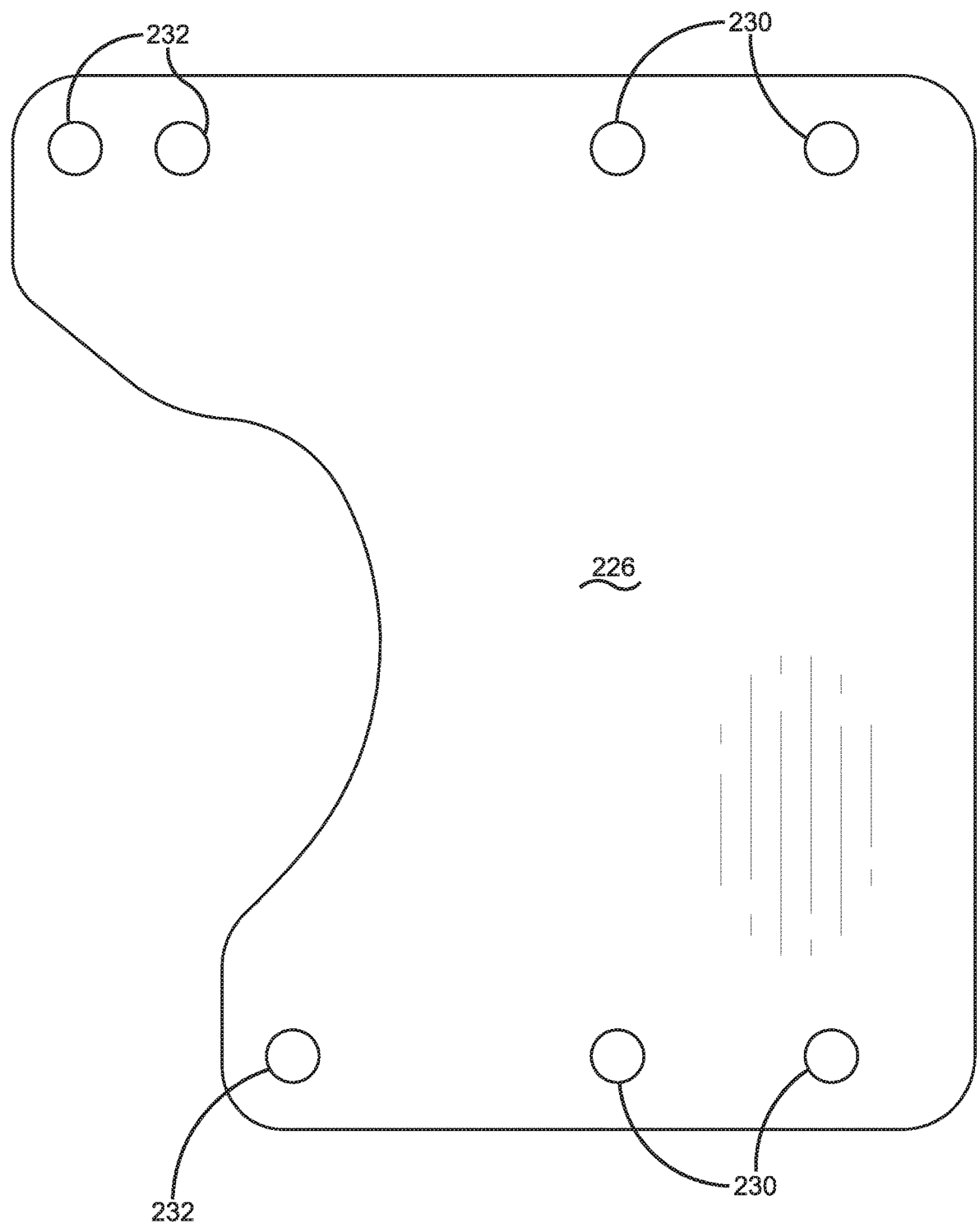
FIG. 24 is a top view of an exemplary anchor plate.

As represented in FIGS. 19 and 24 the exemplary anchor plate 226 extends longitudinally below both brace plate 168 and brace plate 170. The anchor plate 226 is held in operatively fixed attached connection with the respective anchor post 148 by suitable fastening techniques such as fasteners or welding. The exemplary anchor plate 226 includes openings 230 through which respective fasteners 228 extend to engage the anchor post 148, anchor plate 226 and lower frame rail flange 136 in fixed operative engagement. Exemplary anchor plate 226 further includes openings 232. The exemplary openings 232 are used for fasteners that connect the anchor plate and the bottom flanges 188 of brace plates 168 and 170 in a manner later discussed. In other embodiments other structures may be used in lieu of the anchor plates.

In the exemplary arrangement brace legs 232, 234 are attached on opposed lateral sides of each brace plate. In the exemplary arrangement the brace legs are mirror image structures and only brace leg 234 will be described herein in detail for purposes of brevity. As shown in FIGS. 25 through 27 each brace leg includes an upper leg portion 236 and a lower leg portion 238. A middle leg portion 240 extends between the upper leg portion 236 and the lower leg portion 238. In the exemplary arrangement the middle leg portion 240 extends at an acute outside angle A relative to the upper leg portion 236, and at an acute outside angle B with respect to the lower leg portion 238 as represented in FIG. 25. In some exemplary arrangements angles A and B may be the same acute angle, or such angles may be different.

In the exemplary arrangement the upper leg portion 236 includes an opening 242 for receiving a fastener therethrough. The lower leg portion 238 also includes an opening 244 sized for receiving a suitable fastener. In the exemplary arrangement the lower leg portion 238 is somewhat narrower in longitudinal length than the upper leg portion. As a result the middle leg portion 240 includes a tapered area 246 which connects the different longitudinal sized leg portions of the exemplary embodiment. The exemplary brace legs 232, 234 each have their lower leg portions sized to extend in abutting adjacent relation within the channel 198 of the bottom flange 188 of a respective brace plate.

As represented in FIGS. 19 and 20 brace leg 232 extends between side flange 176 and bottom flange 188. The upper leg portion of brace leg 232 extends in adjacent abutting parallel relation to first side flange 176 and is held in fixed engagement with the first side flange and the web 138 of frame rail 130 by a fastener 178. The lower leg portion of the brace leg 232 extends in the channel 198 of the bottom flange 188 and is in adjacent abutting relation with the bottom side 194 of the bottom flange. A fastener 248 holds the lower leg portion, the bottom flange 188 and the anchor plate 266 in operatively fixed engagement. The fastener 248 extends through the opening 232 at the forward side of the brace plate 266, one of the openings 200 in the bottom side 194 of the bottom flange, and the opening in the lower leg of the brace leg 232. In the exemplary arrangement the middle leg portion of the brace leg 232 extends angularly across lower cut out 192. As can be appreciated the brace leg 234 extends on an opposed lateral side of the brace plate 168 in a similar manner to brace leg 232. Thus the brace legs 232 and 234 provide further lateral strength to the structure engaging brace plate 168, the frame rails and the suspension subframe. Of course it should be understood that this approach is exemplary.

As shown in FIG. 19, in the exemplary arrangement similar brace legs 232 and 234 extend on opposed lateral sides of brace plate 170. The brace legs are held in a similar manner extending between the respective adjacent side flange and adjacent frame rail web, and the bottom flange of the brace plate. Further in the exemplary arrangement a further fastener 250 extends through the additional opening 232 in the trailing end of the anchor plate 266 and a laterally inward opening 200 in the bottom flange of brace plate 170. The further fastener provides an additional connection between the anchor plate and the bottom flange 188 and the brace plate 170.

Figure 16:
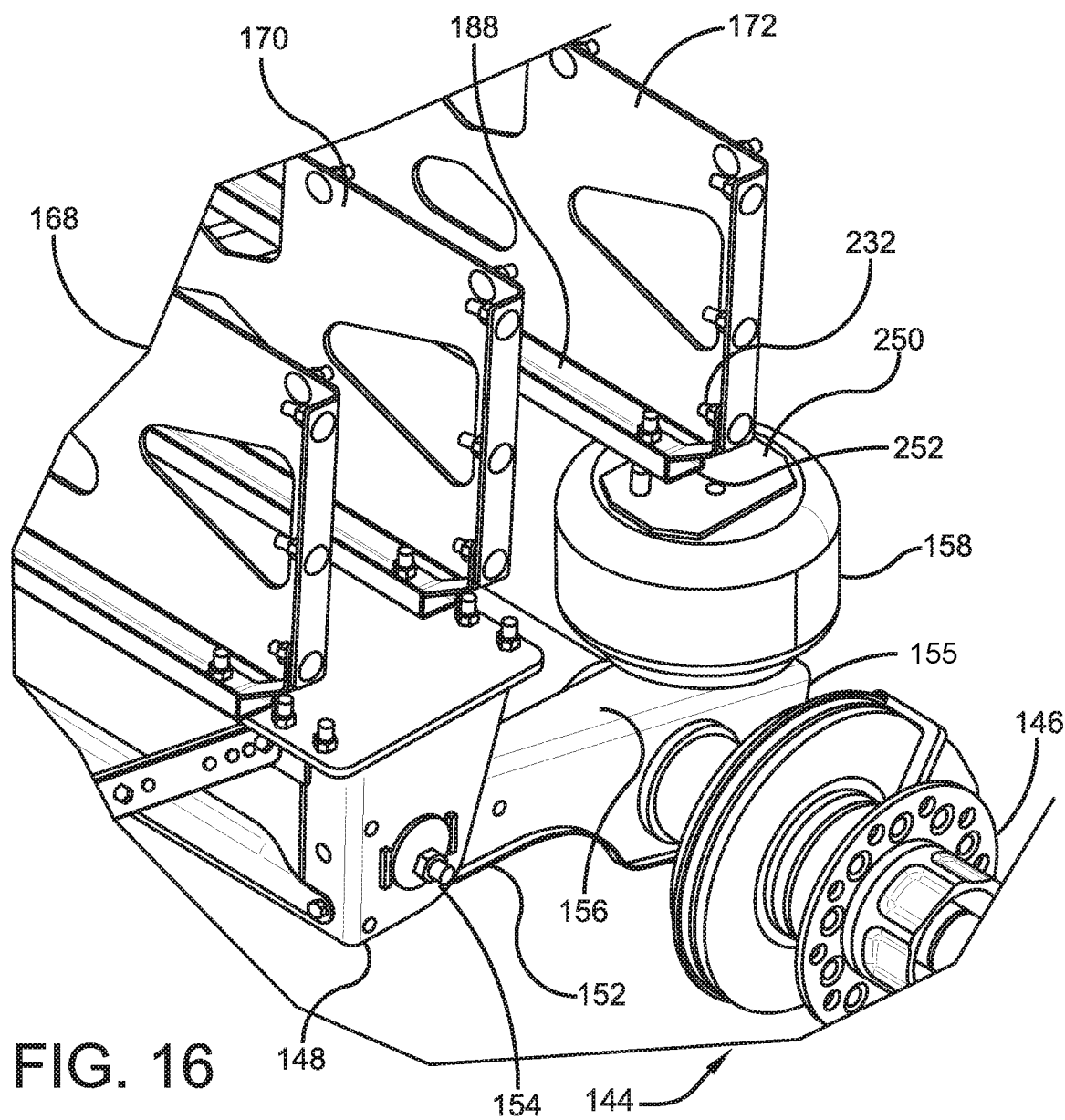
FIG. 16 is a perspective view of the exemplary reinforcing and suspension supporting arrangement with the adjacent frame rails removed for purposes of showing the structural details.

As further shown in FIG. 16 the exemplary arrangement further includes spring plates 250 which are in attached connection below brace plate 172. A respective spring plate 250 is attached at each respective lateral side of brace plate 172. Each spring plate is attached to the bottom flange 188 of the brace plate through a fastener 252 that extends through the spring plate 250, the bottom side of the bottom flange 188 and the lower leg portion of the brace leg. In addition each spring plate 250 is attached by fasteners to the respective lower frame rail flange of the adjacent frame rail. The frame rail is not shown in FIG. 16 to help illustrate the components of the exemplary construction.

A compression spring 158 extends between a spring plate 250 and the top surface 156 of a respective trailing arm at each lateral side of the suspension subframe. As a result the spring plates provide for the springs 158 to act in a biasing manner between the frame and the rear ends of the respective trailing arms so as to provide for vertical movement of the axle under road going conditions. Further as can be appreciated, the exemplary air type compression springs used in exemplary embodiments enable adjustment of the internal pressure as necessary to compensate for differences in loading conditions of the trailer. Of course this arrangement is exemplary and in other embodiments other approaches may be used.

The exemplary strengthening and supporting structures including the brace plates and brace legs provide for increased strength and resistance to deformation. The structures also provide a reliable and accurate arrangement for mounting and positioning the suspension subframe in connection with the frame of the vehicle. The arrangement further provides for a compact and relatively lighter weight mounting structure that also produces less wind resistance to travel at highway speeds. Further, the principles of the exemplary reinforcing and supporting structures described herein can be utilized in numerous different other arrangements to achieve improvements in construction and performance.

Thus the exemplary embodiments described herein achieve improved operation, eliminate difficulties encountered in the use of prior devices and systems, and attain the useful results as described herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the new and useful concepts and structures are not limited to the features shown and described.

It should be understood that features and/or relationships associated with one embodiment may be combined with features and/or relationships of another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated and the advantages and useful results attained; the new and useful features, devices, elements, arrangements, parts, combinations, systems, equipment, operations, methods, processes and relationships are set forth in the appended claims.

We claim:

1. Apparatus comprising:
a trailer, wherein the trailer is configured to movably carry a load,
   wherein the trailer includes
      a pair of longitudinally elongated laterally disposed frame rails,
      a plurality of laterally extending support ribs,
         wherein each support rib is in fixed operative connection with each frame rail,
      a suspension subframe,
         wherein the subframe includes an axle,
         wherein the axle is configured to be in operative engagement with rotatable wheels,
      a plurality of longitudinally spaced generally rectangular brace plates,
         wherein each brace plate extends laterally between the frame rails,
         wherein each brace plate includes
         a generally planar central portion,
            wherein the central portion includes a plurality of openings therethrough,
         a laterally extending upper edge area,
            wherein the upper edge area is in fixed operative connection with a respective support rib,
         first and second side flanges,
            wherein each side flange extends longitudinally and generally perpendicular to the planar central portion, and wherein each side flange is in fixed operative connection with a respective frame rail,
         a bottom flange, wherein the bottom flange is disposed on an opposed side of the brace plate from the upper edge area,
            wherein the bottom flange includes a bottom side that extends perpendicular to the central portion and in the longitudinal direction,
         wherein the suspension subframe is in operative attached connection with the bottom sides of the bottom flanges of the plurality of brace plates.

2. The apparatus according to claim 1 and further comprising
first and second brace legs in operatively fixed connection with each brace plate
   wherein the first brace leg extends between and is in fixed operative connection with each of the first side flange and the bottom side of the bottom flange,
   wherein the second brace leg extends between and is in fixed operative connection with each of the second side flange and the bottom side of the bottom flange.

3. The apparatus according to claim 2
wherein the first brace leg and the second brace leg each include
   an upper leg portion that extends vertically and in parallel abutting relation with the respective operatively connected side flange,
   a lower leg portion that extends horizontally and in parallel abutting relation with the bottom side,
   a middle leg portion that extends at a first acute outside angle relative to the upper leg portion and a second acute outside angle relative to the lower leg portion.

4. The apparatus according to claim 3
wherein the bottom side of the bottom flange in transverse cross section terminates in an upturned end,
wherein the brace plate, the bottom side and the upturned end bound a laterally extending channel,
wherein the lower leg portions of the first and second brace legs extend in and are fastened in operative connection to the bottom side in the channel.

5. The apparatus according to claim 3
wherein each generally rectangular brace plate includes a pair of laterally disposed upper corner areas and a pair of laterally disposed lower corner areas,
wherein the openings in each brace plate are positioned to provide solid material in an X shape region extending between the upper and lower corner areas and centered in the central portion.

6. The apparatus according to claim 5
wherein the openings in each brace plate are configured to provide solid material in
   a first rectangular strip of the brace plate that extends laterally inward from the first side flange, and
   a second rectangular strip of the brace plate that extends laterally inward from the second side flange.

7. The apparatus according to claim 6
wherein the openings in each brace plate provide solid material in
   a rectangular lower strip extending laterally across and vertically upward from the bottom flange and between the first and second rectangular strips.

8. The apparatus according to 7
wherein each brace plate includes a respective rectangular lower cutout in each lower corner area,
and wherein a respective brace leg extends across each respective lower cutout.

9. The apparatus according to claim 8
wherein the upper edge area includes a laterally central upper cut out.

10. The apparatus according to claim 8
wherein the suspension subframe includes
   a pair of laterally disposed anchor posts,
   a pair of trailing arms,
      wherein each trailing arm includes a front end and a rear end,
      wherein the front end of a respective trailing arm is mounted in rotatably movable connection with a respective anchor post,
      wherein the axle is in operative connection with the rear end of each trailing arm,
   a pair of anchor plates,
      wherein one of the pair of anchor plates extends on each respective lateral side below first and second longitudinally spaced, adjacent brace plates,
      wherein each anchor plate extends longitudinally below and in operative fixed connection with the respective bottom flange of each of the first and second brace plates, wherein one respective anchor post is in operatively fixed connection with one respective anchor plate.

11. The apparatus according to claim 10 wherein each frame rail includes a laterally elongated longitudinally extending lower frame rail flange, wherein each anchor plate is in operatively fixed connection with a respective lower frame rail flange.

12. The apparatus according to claim 11 wherein the bottom flanges of each of the first and second brace plates extend laterally between the lower frame rail flanges of the frame rails.

13. The apparatus according to claim 12 wherein each frame rail includes a laterally elongated longitudinally extending upper frame rail flange, wherein the upper frame rail flange is disposed above the lower frame rail flange, wherein in transverse cross section a web of the respective frame rail extends between the upper frame rail flange in the lower frame rail flange, wherein each side flange of each of the first and second brace plates is in fixed operative connection with the web of a respective frame rail.

14. The apparatus according to claim 11 wherein the suspension subframe includes a pair of laterally disposed compression springs,
    wherein each respective spring of the pair is disposed in vertically overlying relation of the rear end of a respective trailing arm,
a third brace plate,
    wherein the third brace plate is longitudinally disposed from the first and second brace plates, and vertically overlies the pair of trailing arms,
a pair of spring plates,
wherein a respective spring plate is disposed on a respective lateral side and below the third brace plate, and is operatively connected to the bottom flange of the third brace plate,
wherein each spring plate vertically overlies a respective spring, such that each respective spring biases a respective trailing arm downward and away from the spring plate.

15. The apparatus according to claim 14 wherein each spring plate is in operatively fixed connection with a respective lower frame rail flange.

16. The apparatus according to claim 14 wherein the suspension subframe includes a laterally extending tie bar,
    wherein the tie bar is operatively connected to each of the anchor posts vertically below the bottom flanges of the first and second brace plates.

17. The apparatus according to claim 15 wherein each anchor post is in operative fixed connection with a strut plate,
wherein each strut plate extends laterally inwardly from the respective anchor post and below the bottom flange of the first and second brace plates,
a pair of struts, wherein each strut extends between the tie bar and a respective strut plate.

18. The apparatus according to claim 1 wherein each generally rectangular brace plate includes a pair of laterally disposed upper corner areas and a pair of laterally disposed lower corner areas,
wherein the openings in each brace plate are positioned to provide solid material in an X shaped region extending between the upper and lower corner areas and centered in the central portion.

19. The apparatus according to claim 1 wherein the suspension subframe includes
    a pair of laterally disposed anchor posts,
    a pair of trailing arms,
        wherein each trailing arm includes a front end and a rear end,
        wherein a front end of a respective trailing arm is mounted in rotatably movable connection with a respective anchor post,
        wherein the axle is in operative connection with the rear end of each trailing arm,
    a pair of anchor plates,
        wherein one of the pair of anchor plates extends on a respective lateral side below first and second longitudinally spaced, adjacent brace plates,
        wherein each anchor plate extends longitudinally below and in operative fixed connection with the bottom flange of each of the first and second brace plates,
        wherein one respective anchor post is in operatively fixed connection with one respective anchor plate.

20. The apparatus according to claim 19 wherein the suspension subframe includes a pair of laterally disposed compression springs,
    wherein each respective compression spring of the pair is disposed in vertically overlying relation of a rear end of a respective trailing arm,
a third brace plate,
    wherein the third brace plate is longitudinally disposed from the first and second brace plates, and vertically overlies the pair of trailing arms,
a pair of spring plates,
    wherein a respective spring plate is disposed on a respective lateral side and below the third brace plate and is operatively connected to the bottom flange of the third brace plate,
    wherein each spring plate vertically overlies a respective spring, such that each respective spring biases a respective trailing arm downward and away from the spring plate.

* * * * *